US009660962B2

(12) United States Patent
McKinion

(10) Patent No.: US 9,660,962 B2
(45) Date of Patent: May 23, 2017

(54) NETWORK-ATTACHED STORAGE GATEWAY VALIDATION

(71) Applicant: NetApp, Inc., Sunnyvale, CA (US)

(72) Inventor: James Paul McKinion, Austin, TX (US)

(73) Assignee: NetApp, Inc., Sunnyvale, CA (US)

( * ) Notice: Subject to any disclaimer, the term of this patent is extended or adjusted under 35 U.S.C. 154(b) by 68 days.

(21) Appl. No.: 14/864,510

(22) Filed: Sep. 24, 2015

(65) Prior Publication Data
US 2017/0093798 A1   Mar. 30, 2017

(51) Int. Cl.
*H04L 29/06* (2006.01)
*G06F 17/30* (2006.01)
*H04L 29/08* (2006.01)

(52) U.S. Cl.
CPC .... *H04L 63/0281* (2013.01); *G06F 17/30197* (2013.01); *G06F 17/30235* (2013.01); *G06F 17/30371* (2013.01); *H04L 67/1097* (2013.01)

(58) Field of Classification Search
CPC ............. H04L 63/0281; H04L 67/1097; G06F 17/30197; G06F 17/30235; G06F 17/30371
See application file for complete search history.

(56) References Cited

U.S. PATENT DOCUMENTS 7,747,996 B1 * 6/2010 Dice .................. G06F 8/72
710/200
8,180,813 B1 * 5/2012 Goodson ........... G06F 17/30997
707/827
8,635,707 B1 * 1/2014 Parenti .............. G06F 21/6218
713/182
2005/0021781 A1 * 1/2005 Sunder .............. G06F 21/31
709/229
2006/0271598 A1 * 11/2006 Wong ............... G06F 17/30212
2006/0288406 A1 * 12/2006 Kuhn .................. H04L 63/162
726/8
2011/0137966 A1 * 6/2011 Srinivasan .......... H04L 67/1097
707/828

(Continued)

OTHER PUBLICATIONS

Gobioff et al., "Security for Network Attached Storage Devices", Retrieved From https://people.eecs.berkeley.edu/~tygar/papers/Security_for_NASD.pdf, Published Oct. 1997.*

(Continued)

*Primary Examiner* — Chau Le
(74) *Attorney, Agent, or Firm* — Gilliam IP PLLC

(57) ABSTRACT

An indication to validate operation of a network-attached storage gateway is received. The network-attached storage gateway communicatively couples a client and an object store. a virtual namespace is generated based, at least in part, on a network-based file system implemented by the network-attached storage gateway. A first file system entity is selected from the virtual namespace. A first identifier of the first object in the object store is determined. The first object corresponds to the first file system entity. The first object is retrieved from the object store based, at least in part, on the first identifier. The first object is retrieved by bypassing the network-attached storage gateway. It is determined whether the first object matches the first file system entity.

20 Claims, 14 Drawing Sheets

(56) References Cited

U.S. PATENT DOCUMENTS

| | | | |
|---|---|---|---|
| 2013/0268644 A1* | 10/2013 | Hardin | H04L 61/1582 709/223 |
| 2015/0058384 A1* | 2/2015 | Karamanolis | G06F 17/30194 707/827 |
| 2015/0347402 A1 | 12/2015 | McKinion | |
| 2015/0347425 A1 | 12/2015 | McKinion | |

OTHER PUBLICATIONS

McKinion, U.S. Appl. No. 14/534,039, filed Nov. 5, 2014.

* cited by examiner

NETWORK-ATTACHED STORAGE GATEWAY VALIDATION

BACKGROUND

The disclosure generally relates to the field of storage systems, and more particularly to network-attached storage.

Network-attached storage ("NAS") is a storage architecture that implements file-level storage. Data stored in NAS is grouped into one or more files as part of a file system. When interfacing with NAS, a client identifies data by referencing a particular file (or portion of a file). The file-level operation of NAS can be contrasted with the block-level operation of a Storage Area Network ("SAN"). When interfacing with a SAN, a client identifies data by referencing one or more blocks as opposed to the higher-level construct of a file.

An object store is a third type of storage architecture. Instead of a hierarchical structure, as typically used for file-level storage, an object store generally utilizes a flat structure and stores "objects" identified by unique identifiers. An object is grouping of data treated as a unit. When interfacing with an object store, a client identifies data by referencing a particular object identifier.

BRIEF DESCRIPTION OF THE DRAWINGS

Aspects of the disclosure may be better understood by referencing the accompanying drawings.

DESCRIPTION

Figure 1:
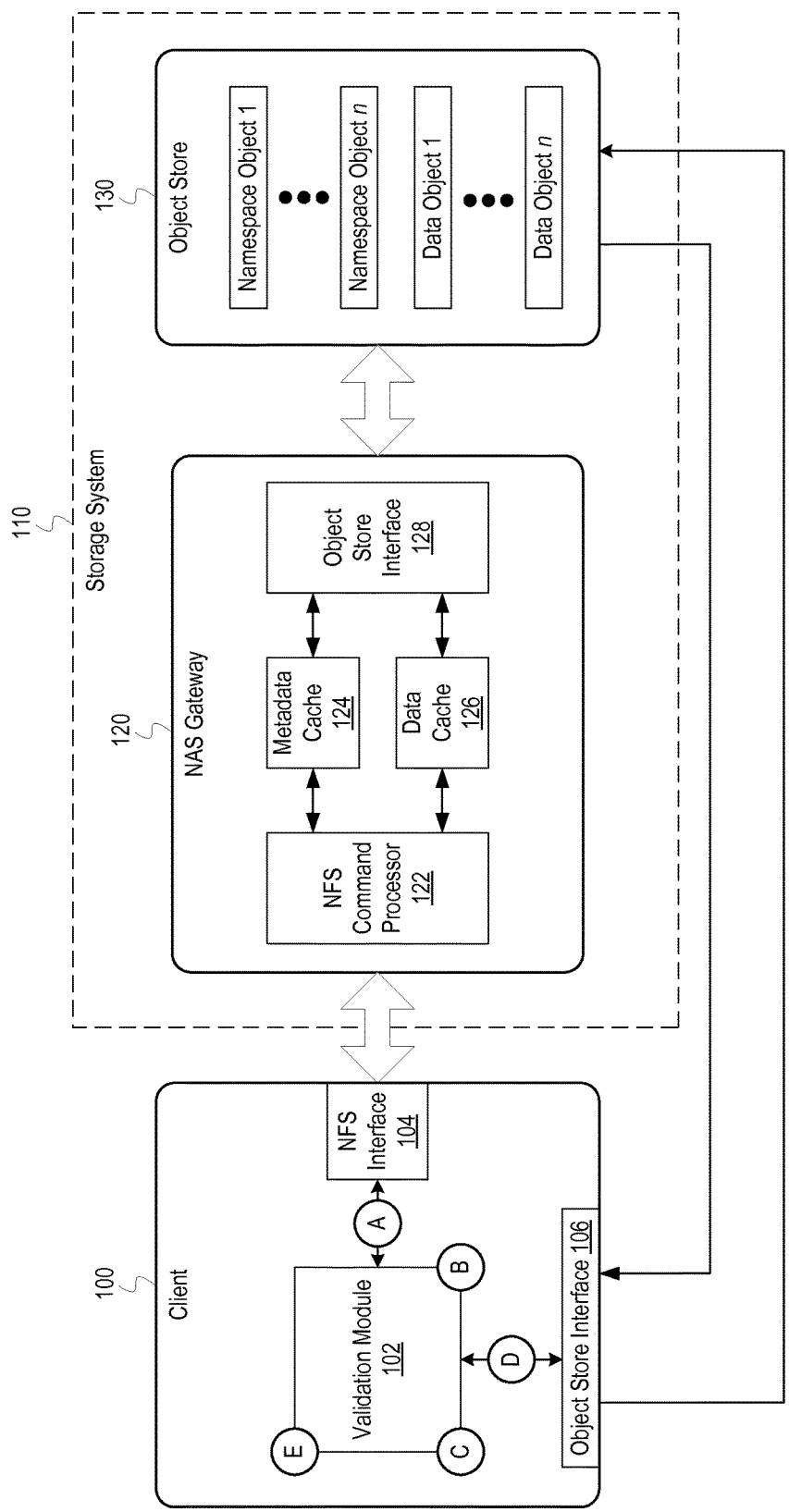
FIG. 1 depicts example operations for statically validating the operation of a NAS gateway.

The description that follows includes example systems, methods, techniques, and program flows that embody aspects of the disclosure. However, it is understood that this disclosure may be practiced without these specific details. For instance, this disclosure refers to the NFS protocol and associated operations in illustrative examples. But aspects of this disclosure can be applied to other network-attached storage protocols. In other instances, well-known instruction instances, protocols, structures and techniques have not been shown in detail in order not to obfuscate the description.

A NAS gateway allows a client implementing a NAS protocol, such as the Network File System ("NFS") protocol, to interface with a storage system that uses a different storage architecture, such as an object store. To facilitate interactions with a storage system using a different storage architecture, the NAS gateway maps the file system used by the client to the storage architecture used by the storage system. For example, the client may send a read request to the NAS gateway that identifies a particular file within a particular directory. The NAS gateway may map the requested file to a particular object within the object store and retrieve the associated object. The NAS gateway also translates operations received from the client into operations compatible with the storage system. For example, while the NFS protocol supports a hierarchical file system layout, an object store may be flat. As such, an NFS rename operation (which is used to move a file between locations in the file system) may not be directly compatible with an object store. Thus, the NAS gateway translates an NFS rename operation into the equivalent operations applicable to the object store.

Data corruption and inconsistency can occur at various points between a client and a storage system, and the use of a NAS gateway can increase the chances of data corruption and inconsistency. For example, a NAS gateway may implement a write-back cache (or variation thereof), in which write operations are not pushed to a backing store when they occur at the NAS gateway. As another example, errors may occur during the mapping of a file between the client and the storage system.

Because the use of a NAS gateway increases the complexity of the storage system, validation of the data is similarly complex. For example, consider a NAS gateway that includes a write-back cache. Attempting to validate a write operation by writing data to the NAS gateway and reading the data back from the NAS gateway may return data stored in the cache. Thus, an error that occurs between the cache and the backing store may not be detected and whether the data was actually written to the backing store may be unknown.

To validate the operation of a NAS gateway, a validation module interfaces with both the NAS gateway and the backing store. The validation module builds a virtual namespace by traversing the file system as exported by the NAS gateway. The validation module performs static validation of the NAS gateway by comparing properties of the virtual namespace and exported NAS file system with the data stored in the backing store. The validation module performs dynamic validation of the NAS gateway by performing operations on the file system entities (e.g., directories, files, etc.) and verifying the results of the operations on the backing store by comparing the data stored in the backing store to the virtual namespace and exported NAS file system.

FIG. 1 depicts example operations for statically validating the operation of a NAS gateway. FIG. 1 depicts a client 100 and a storage system 110. The client 100 includes a validation module 102, an NFS interface 104, and an object store interface 106. The storage system 110 includes an NAS gateway 120 and an object store 130. The client 100 is communicatively coupled to the NAS gateway 120 via the NFS interface 104 and to the object store 130 via the object store interface 106. Communications sent to the object store 130 via the object store interface 106 bypass the NAS gateway 120.

General Operation

The particular techniques used to validate the operation of the NAS gateway 120 can vary depending on the implementation of the NAS gateway 120. This section provides a brief overview of how the NAS gateway 120 operates in conjunction with the client 100 and the object store 130.

During operation, the client 100 reads and writes data to the storage system 110 via the NAS gateway 120. In particular, the NAS gateway 120 "exports" a network-based file system. The NFS interface 104 is configured to present the network-based file system to the client 100 as a local file system (sometimes referred to as an "NFS mount"). However, when operations are performed on file system entities within the network-based file system, the NFS interface 104 translates the operations from native file system operations to NFS operations and sends the translated operations to the NAS gateway 120.

When the NAS gateway 120 receives the operations, operations are sent to an NFS command processor 122. The NFS command processor 122 processes the NFS operations. The particular operations performed by the NFS command processor 122 can vary depending on the NFS operation received. For example, an NFS operation may result in the NFS command processor 122 writing data to a metadata cache 124 and/or a data cache 126 (collectively "the caches") or reading data from the metadata cache 124 and/or the data cache 126. The NFS command processor 122 sends a response to the NFS interface 104 if appropriate.

Changes to the underlying data are stored in either the metadata cache 124 or data cache 126. Periodically, the NAS gateway 120 flushes changed data from the metadata cache 124 and the data cache 126 to the object store 130. The NAS gateway 120 may flush the changed data when one of the caches is full, after a particular amount of time has elapsed, etc. Additionally, the NAS gateway 120 may flush the changed data for one of the caches (e.g., the data cache 126) but not flush the changed data in the other cache (e.g., the metadata cache 124). To flush the changed data from one of the caches, the NAS gateway 120 determines which data in the particular cache has changed (e.g., is "dirty") and has not been written to the object store 130. Once the NAS gateway 120 determines which data has changed, the NAS gateway 120 directs an object store interface 128 to write the changed data to the appropriate object in the object store 130.

As mentioned above, a NAS gateway maps data from a first storage architecture to a second storage architecture. In this example, the NAS gateway 120 maps an NFS-based storage architecture to an object-based storage architecture. The particular component that performs the mapping operations can vary. For example, the NFS command processor 122 may not perform any mapping operations, thus writing any changed data to the caches as if the underlying data was organized as presented to the client 100. In such a scenario, the object store interface 128 may perform the mapping operations. In some instances, the NFS command processor 122 may perform the mapping operations, thus writing changed data to the cache in accordance with the organization of the data on the object store 130.

Mapping an NFS-Based Storage Architecture to an Object-Based Storage Architecture The particular techniques used to validate the operation of the NAS gateway 120 can also vary depending on the mechanism used to map the NFS-based storage architecture used by the client 100 to the object-based storage architecture used by the object store 130. This section provides a brief overview of how the NAS gateway 120 maps the NFS-based storage architecture used by the client 100 to the object-based storage architecture used by the object store 130.

Each file system entity (e.g., a file or directory) in the network-based file system is represented by an inode. The inode is identified by an inode number and can include metadata about the particular file system entity. The inode also includes references to data that comprises the file system entity. The NAS gateway 120 maps the file system entities to the flat storage architecture of the object store 130 by storing a namespace object that identifies a particular file system entity and includes a reference to a data object. The namespace object can also include metadata about the file system entity while the corresponding data object includes the actual data that represents the file system entity.

The namespace object corresponding to the root of the network-based file system is associated with the identifier V'. The other namespace objects (which correspond to file system entities other than the root) are uniquely identified by the inode number of their parent file system entity and the name of the file system entity. For example, assume the directory "home" is located in the root directory and the root directory is associated with inode number '1'. The namespace object corresponding to the "home" directory would be identified by "1/home". If a directory "user" is located in the home directory and the home directory is associated with inode number '5', the namespace object corresponding to the "user" directory would be identified by "5/user".

The actual data for a particular file system entity is stored in a data object, as mentioned above. The data object corresponding to a particular file system entity is identified by the inode number of the file system entity. Thus, the data object for the "home" directory would be identified by the value '5'.

Because inode numbers are unique and file system entity names are unique with respect to a parent inode, the namespace object and data object identifiers will not collide. Further, the only information used to retrieve the metadata and data for a particular file system entity is the parent inode number and the name of the file system entity. Thus, the validation module 102 can retrieve a namespace object and corresponding data object by reading file system entity attributes from a virtual namespace.

Static Validation-Related Operations

Stages A through E depict a set of operations for statically validating the operation of the NAS gateway 120.

At stage A, the validation module 102 builds a virtual namespace based, at least in part, on the network-based file system presented to the client 100 by the NFS interface 104. To build the virtual namespace, the validation module 102 traverses the network-based file system and reads the metadata associated with the associated file system entities. In particular, the validation module 102 identifies a root entity (e.g., a root directory), and traverses each child entity within the root entity. File system entities can include directories, files, metadata, etc. As the validation module 102 traverses the network-based file system, the validation module 102 reads metadata associated with the file system entities and stores representations of the file system entities, along with associated metadata, in a data structure. For example, the validation module 102 may identify the root entity and write the inode number and name of the root entity in the virtual namespace. The validation module 102 may also store metadata associated with the root entity in the virtual namespace. The metadata can include a count of child entities in the root entity, a timestamp indicating the last time the root entity was modified, etc. The validation module 102 may determine all child entities comprising the root entity. The validation module 102 may perform similar operations for the child entities. If a child entity is a directory, the validation module 102 may recursively traverse the child entity in a similar manner.

The validation module 102 also represents the hierarchical structure of the network-based file system. For example, the validation module 102 may store links between a particular file system entity and all child entities of the file system entity. The validation module 102 may also perform mapping operations. For example, instead of storing a hierarchical representation of the network-based file system in the virtual namespace, the validation module 102 may map the file system entities to objects that correspond with objects in the object store 130. For example, instead of storing a set of hierarchical links between the root node and a file several directories deep, the validation module 102 may generate and store the corresponding namespace objects.

If a file system entity is a file, the validation module 102 can compute a checksum of the file and store the checksum as part of the metadata associated with that particular file system entity. The checksum can then be used to validate the accuracy of data stored in the object store 130, as described below. The particular technique used to compute the checksum can vary. For example, the object store 130 may compute checksums for objects stored in the object store 130 and store the checksum in metadata associated with the objects. The technique used by the validation module 102 to compute the checksum of a file can mimic the technique used by the object store 130. By using the same technique as the object store 130, the validation module 102 does not need to read an object from the object store 130 and compute a checksum. Rather, the validation module 102 can read the checksum for the object and compare it to the checksum generated by the validation module 102 and stored as part of the virtual namespace.

The validation module 102 may not compute the checksum for each file; instead, the validation module 102 may compute the checksum for each file on demand. For example, the validation module 102 may only validate a subset of the files in the network-based file system. Thus, the validation module 102 may compute the checksum for files included in the subset instead of all of the files.

At stage B, the validation module 102 selects a file system entity from the virtual namespace. Which file system entity the validation module 102 selects can vary depending on the static validation technique implemented by the validation module 102. For example, if the validation module 102 performs an exhaustive validation of the file system entities in the virtual namespace, the validation module 102 may iterate over each of the file system entities. The validation module 102 may then select the next file system entity in the virtual namespace. If the validation module 102 does not perform an exhaustive validation of the file system entities, the validation module 102 may randomly select a file system entity in the virtual namespace. The validation module 102 may select a file system entity based on particular criteria. For example, the validation module 102 may select files from the virtual namespace but skip directories. Even if the validation module 102 randomly selects file system entities from the virtual namespace, the validation module 102 may apply criteria to the selection of the file system entities. For example, two-thirds of the file system entities selected may be files and one-third of the file system entities selected may be directories.

At stage C, the validation module 102 maps the selected file system entity to an object stored in the object store 130. The particular technique used to map the file system entity is substantially similar to that performed by the NAS gateway 120. In particular, the validation module 102 determines the unique identifier for the namespace object that corresponds to the selected file system entity by determining the parent inode number and the name of the file system entity. The validation module 102 also determines the inode number of the selected file system entity, which identifies the corresponding data object.

At stage D, the validation module 102 retrieves the objects that correspond to the selected file system entity from the object store 130. To retrieve the objects, the validation module 102 sends an indication of the objects, such as the objects' unique identifier, to the object store interface 106. The object store interface 106 then queries the object store 130 for the objects.

In some configurations, the validation module 102 may retrieve multiple objects before retrieving the target objects. For example, to retrieve a particular data object, the validation module 102 may first identify the namespace object that corresponds to the data object. As described above, the namespace object includes a reference to the corresponding data object (e.g., the data object's unique identifier). Thus, the validation module 102 may query the object store 130 for the namespace object and read the unique identifier associated with the namespace object. The validation module 102 can then query the object store 130 for the data object itself by using the unique identifier associated with the namespace object.

In some instances, the validation module 102 may fail to retrieve the object. For example, if the inode number used to identify a particular file system entity is incorrect either in the virtual namespace or the object store, the query may fail because an object with a key using the inode number does not exist in the object store. If the object is not found in the object store, the validation module 102 does not perform the operations of stage E. Instead, the validation module 102 can indicate that validation failed, halt validation, etc.

At stage E, the validation module 102 validates the retrieved objects. To validate the retrieved objects, the validation module 102 compares the retrieved objects to the corresponding file system entity from the virtual namespace. Initially, the validation module 102 determines whether the retrieved objects are coalesced. To determine whether the retrieved objects are coalesced, the validation module 102 compares a timestamp indicating when the file system entity was last modified to a corresponding timestamp associated with the retrieved objects. If the timestamps match, then the validation module 102 determines that the retrieved objects are coalesced. If the timestamps do not match, then the validation of the retrieved object fails.

In some instances, the validation module 102 compares the timestamp of one of the retrieved object to the timestamp of one or more other objects. For example, metadata associated with a data object may be stored with the corresponding namespace object. To determine whether the data object is coalesced, the validation module 102 may compare a timestamp associated with the namespace object.

In some instances, the validation module 102 may determine whether the namespace object and/or the data object is coalesced by referencing a version number. For example, each time a change is made to a file system entity via the NFS interface 104, a value associated with the file system entity may be incremented. Thus, the validation module 102 can compare the current value stored with the namespace object or data object to the current value indicated in the virtual namespace. Use of a version number can help the validation module 102 detect when the namespace object is not synchronized with the corresponding data object. For example, the last modified timestamp may be stored with the data object, while the version number may be stored with the namespace object. Each time the last modified timestamp is updated, the version number is updated as well. However, if the metadata cache 124 is flushed to the object store 130 but the data cache 126 is not, the namespace object stored in the object store 130 will have the correct version number but the data object stored in the object store 130 will not have the correct timestamp. If the file system does not include a metadata field specifically for a version number, the validation module 102 can use an existing field. For example, if the validation is being performed on a file system that is not being used (e.g., not a live file system), the validation module 102 might store the version number in a group identifier field.

If the validation module 102 determines that the retrieved objects are coalesced, the validation module 102 can validate the retrieved objects. The particular operations performed by the validation module 102 to validate the retrieved objects can vary. For example, if the selected file system entity is a file, the validation module 102 might compare a checksum of the file with a checksum of the retrieved objects (or one of the retrieved objects). If the selected file system entity is a directory, on the other hand, the validation module 102 may not compare a checksum. Instead, the validation module 102 may determine whether the number of child entities in the directory matches the number of child entities identified in the retrieved objects. Examples of particular validation operations are discussed in more detail below.

By determining whether the object in the object store 130 is valid, the validation module 102 determines whether an error occurred in either reading data from or writing data to the object store 130. If an error occurred in reading data from the object store 130, the file system entity may include incorrect data, resulting in a failure to validate the object. If an error occurred in writing data to the object store 130, the object may contain incorrect data, resulting in a failure to validate the object.

The operations described at stages B through E can be repeated until a halt criterion is met. The particular halt criterion can vary. For example, if the validation is an exhaustive validation, the halt criterion may be met when all file system entities have been validated. If the validation is not an exhaustive validation, the halt criterion may be met when a particular percentage of the file system entities have been validated, when all file system entities of a particular type have been validated, etc. In some instances, a failure to validate a particular file system entity may cause the validation process to halt after stage E. In some instances, the validation module 102 continues to perform the operations described at stages B through E even if the validation of a particular file system entity has failed.

The particular action(s) performed after the validation module 102 has completed the validation or otherwise halts the validation process can vary. For example, if the validation failed, the validation module 102 may alert an administrator, write the validation errors to a log file, etc.

Additionally, although the validation module 102 and the object store interface 106 are depicted as separate components of the client 100, the validation module 102 and the object store interface 106 can be a single component. Further, although the validation module 102 is described as performing the mapping operations at stage C, the object store interface 106 may perform some or all of the mapping operations. For example, instead of determining which objects of the object store 130 should be retrieved to validate a particular file system entity, the validation module 102 may provide an indication of the file system entity to the object store interface 106. The object store interface 106 may then determine which objects should be retrieved, retrieve the objects from the object store 130, and return the retrieved objects to the validation module 102.

The example of FIG. 1 depicted static validation of a NAS gateway. Static validation differs from dynamic validation inasmuch as static validation validates a dataset without validating specific operations performed on the dataset. In other words, the static validation described above is agnostic to any NFS operations performed prior to the validation. Dynamic validation, on the other hand, validates the results of particular operations. For example, during dynamic validation, a validation module may perform an operation to modify an aspect of a network-based file system, then validate that the resulting change correctly propagated through to the backing store.

Figure 2:
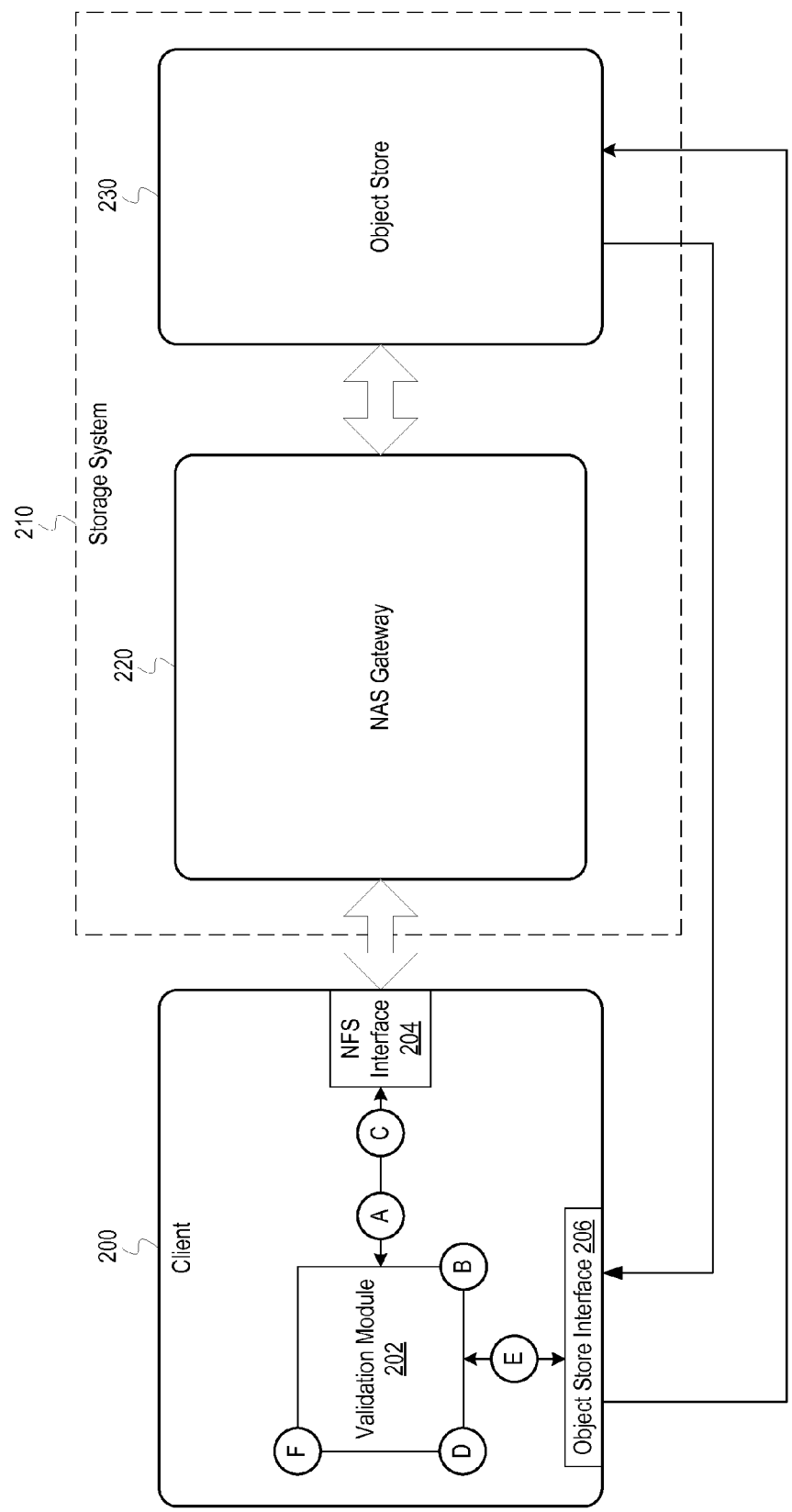
FIG. 2 depicts example operations for dynamically validating the operation of a NAS gateway.

FIG. 2 depicts example operations for dynamically validating the operation of a NAS gateway. FIG. 2 depicts a client 200 and a storage system 210 to which the client 200 is communicatively coupled. The client 200 includes a validation module 202, an NFS interface 204, and an object store interface 206. The storage system 210 includes an NAS gateway 220 and an object store 230. The NAS gateway 220 and the object store 230 can be configured and operate similarly to the NAS gateway 120 and object store 130 of FIG. 1.

Dynamic Validation-Related Operations

At stage A, the validation module 202 builds a virtual namespace based, at least in part, on the network-based file system presented to the client 200 by the NFS interface 204. The operations performed by the validation module 202 to build the virtual namespace can be substantially similar to those performed at stage A of FIG. 1.

At stage B, the validation module 202 selects an operation to perform on the network-based file system and, if appropriate, selects a file system entity from the virtual namespace. The validation module 202 can select the operation to perform by selecting an operation from a list of available operations. The particular technique used to select the operation to perform can vary. For example, the validation module 202 can iterate over the list of operations, sequentially selecting each operation. As another example, the validation module 202 may randomly select an operation from the list. The validation module 202 may apply weights to the operations, thus selecting some operations with higher weights more frequently than operations with lower weights.

Once the validation module 202 selects an operation to perform, the validation module 202 selects a file system entity from the virtual namespace to apply the operation to, if appropriate. For example, if the validation module 202 selected a write operation, the validation module 202 selects a particular file from the virtual namespace to which to write data to. As another example, if the validation module 202 selects an operation to create a directory, the validation module 202 selects a particular directory from the virtual namespace to create the new directory in. The validation module 202 can select the file system entity by determining the types of file system entities that the selected operation can operate on. The validation module 202 may refer to a list of file system entities corresponding to the particular operation.

In some instances, the validation module 202 can select the file system entity from the virtual namespace prior to selecting a particular operation. In such instances, the validation module 202 can select the file system entity in a manner substantially similar to that described at stage B of FIG. 1. Once the validation module 202 selects a particular file system entity from the virtual namespace, the validation module 202 can select an operation that can be performed on the file system entity.

At stage C, the validation module 202 performs the selected operation and updates the virtual namespace as appropriate. Typically, to perform the selected operation, the validation module 202 provides an indication of the operation and any associated parameters to the NFS interface 204. In some instances, the validation module 202 may perform additional ancillary operations in addition to the selected operation. For example, the validation module 202 might perform a "commit" operation to cause the NAS gateway 220 to write any changed data to the object store 230 after performing the selected operation.

Once the validation module 202 performs the selected operation, the validation module 202 updates the virtual namespace to reflect any changes resulting from the operation. For example, if the selected operation was a write operation applied to a particular file, the validation module 202 might update the virtual namespace to include an updated last modified timestamp and an updated checksum corresponding to the written data.

At stage D, the validation module 202 maps any file system entity modified by the selected operation to an object stored in the object store 230. To map file system entities to an object stored in the object store 230, the validation module 202 can perform operations substantially similar to those performed at stage C of FIG. 1.

At stage E, the validation module 202 retrieves the objects determined at stage D from the object store 230. The validation module 202 can retrieve the objects in a manner similar to that described at stage D of FIG. 1.

At stage F, the validation module 202 validates the retrieved objects. To validate the retrieved objects, the validation module 202 performs operations similar to those described at stage E of FIG. 1.

The operations performed at stages B through F can be repeated until a halt criterion is met. For example, the operations may be performed for a certain length of time, until each operation is validated a certain number of times, or until the validated operations meet a predefined criterion (e.g., the operations performed are similar in quantity to those that would be performed under normal operating conditions). Additionally, the validation module 202 may perform the operations of stages B and C multiple times before validating changed objects. In some instances, the validation module 202 may perform the operations of stages B and C until the halt criterion is met, then perform a static validation as described above.

Although the operations performed to dynamically validate the operation of the NAS gateway 220 are similar to the operations performed to statically validate the operation of the NAS gateway 220, dynamic validation allows for specific operations to be validated. Static validation, however, may have no control over the operations performed prior to the validation. Thus, if one or more operations are not performed prior to the static validation, the validation module 202 may not be capable of detecting errors that might otherwise be caused by the unperformed operations.

Figure 3:
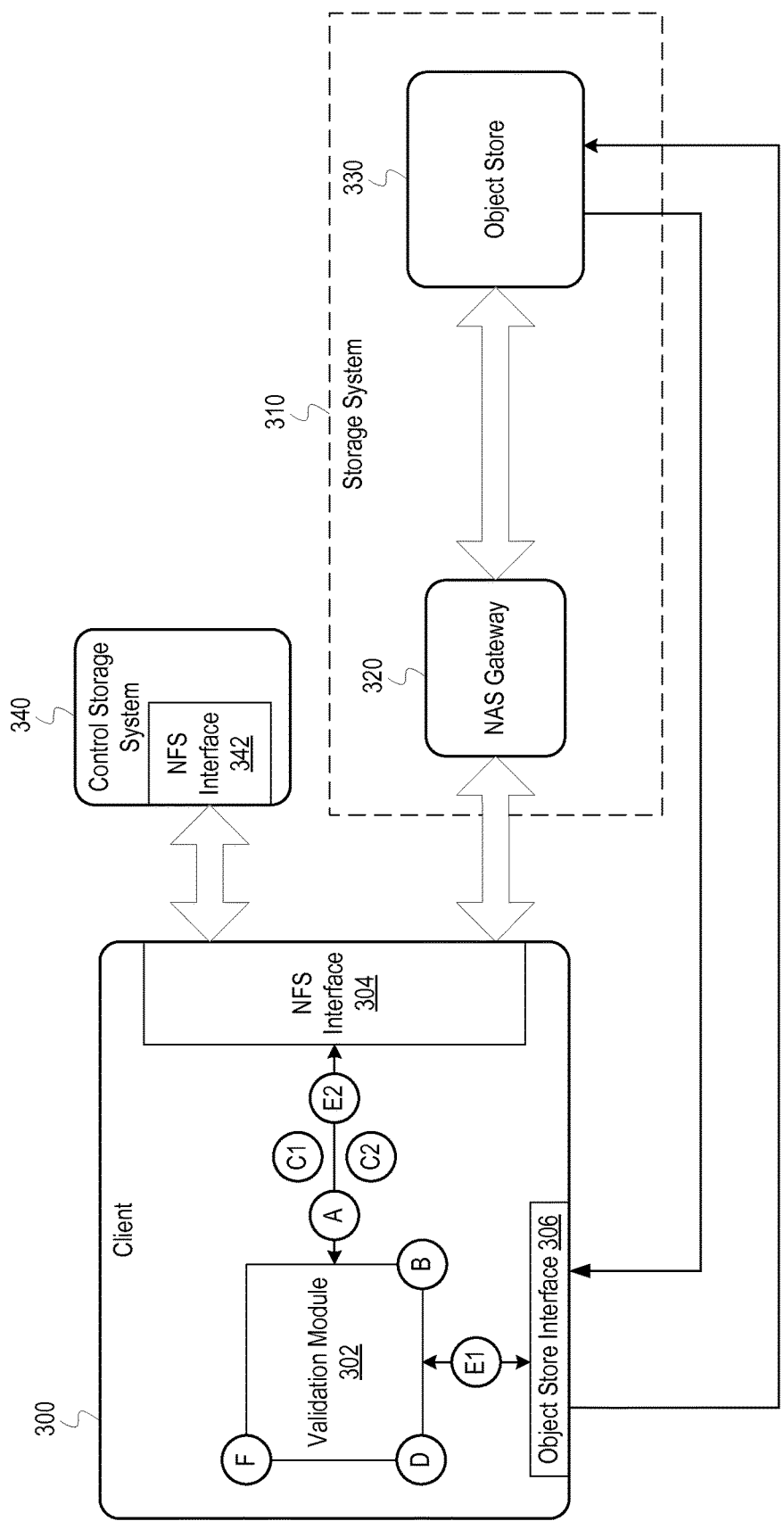
FIG. 3 depicts example operations for dynamically validating a NAS gateway using a control storage system.

FIG. 3 depicts example operations for dynamically validating a NAS gateway using a control storage system. FIG. 3 depicts a client 300, a storage system 310, and a control storage system 340. The client 300 includes a validation module 302, an NFS interface 304, and an object store interface 306. The storage system 310 includes an NAS gateway 320 and an object store 330. The NAS gateway 320 and the object store 330 can be configured and operate similarly to the NAS gateway 120 and object store 130 of FIG. 1. The control storage system 340 includes an NFS interface 342.

General Operation

The general operation of the storage system 310 is similar to that of the storage system 110 of FIG. 1. The general operation of the client 300, however, varies from the operation of the client 100 of FIG. 1. In particular, the NFS interface 342 exports a network-based file system, similar to the NAS gateway 320. The NFS interface 304 presents both the network-based file system exported by the NFS interface 342 (hereinafter the "control NFS") and the network-based file system exported by the NAS gateway 320 (hereinafter the "test NFS") to the client 300. The control storage system 340 includes a standard NFS implementation instead of utilizing a NAS gateway 320 and a different storage architecture for the backing store like the storage system 310.

Dynamic Validation-Related Operations

At stage A, the validation module 302 builds a virtual namespace based, at least in part, on the test NFS presented to the client 300 by the NFS interface 304. The operations performed by the validation module 302 to build the virtual namespace can be substantially similar to those performed at stage A of FIG. 2. Because the control NFS and the test NFS are mirrors of each other, a single virtual namespace may be sufficient. However, the validation module 302 may be configured to build a separate virtual namespace for the control NFS.

At stage B, the validation module 302 selects an operation to perform on the network-based file systems and, if appropriate, selects a file system entity from the virtual namespace. The operations performed by the validation module 302 at stage B can be substantially similar to those performed at stage B of FIG. 2.

At stage C1, the validation module 302 performs the selected operation on the test NFS and updates the virtual namespace as appropriate. To perform the selected operation and update the virtual namespace, the validation module 302 can perform substantially similar operations to those performed at stage C of FIG. 2.

At stage C2, the validation module 302 performs the selected operation on the control NFS. To perform the selected operation, the validation module 302 can perform substantially similar operations to those performed at stage C1. However, instead of targeting the test NFS, the validation module 302 targets the control NFS. If the validation module 302 maintains a separate virtual namespace for the control NFS, the validation module 302 updates the control NFS virtual namespace as appropriate.

At stage D, the validation module 302 maps any file system entity modified by the selected operation to an object stored in the object store 330. To map file system entities to an object stored in the object store 330, the validation module 302 can perform operations substantially similar to those performed at stage D of FIG. 2.

At stage E1, the validation module 302 retrieves the objects determined at stage D from the object store 330. The validation module 302 can retrieve the objects in a manner similar to that described at stage E of FIG. 2.

At stage E2, the validation module 302 retrieves any file system entity modified by the selected operation from the control storage system 340. In particular, the validation module 302 performs an operation on the control NFS that reads the corresponding file system entity from the control storage system 340. As described above, the NFS interface 304 receives the operation from the validation module 302 and sends the operation to the NFS interface 342. The NFS interface 342 reads the associated data from the control storage system 340 and returns the data to the NFS interface 304. The NFS interface 304 then returns the data to the validation module 302.

At stage F, the validation module 302 validates the retrieved objects. To validate the retrieved objects, the validation module 302 performs operations similar to those described at stage F of FIG. 2. The validation module 302 also validates the retrieved objects against the file system entities retrieved from the control storage system 340. The operations performed to validate the retrieved objects against the file system entities retrieved from the control storage system 340 are similar to those performed to validate the retrieved objects against the virtual namespace. However, the retrieved objects (and their associated metadata) are compared to the data received from the control storage system 340 in addition to the virtual namespace.

The use of the control storage system 340 provides an additional data source for validation. Because the control storage system 340 operates as a typical NFS server/storage system, the operation of the NAS gateway 320 can be directly validated against an actual NFS implementation. By validating against an actual NFS implementation, the validation module 302 can identify errors in the validation module 302 itself. For example, if the NAS gateway 320 and the validation module 302 include a similar defect, the data in the object store 330 may match the virtual namespace (which is maintained by the validation module 302). However, such defects may become apparent when the operation of the NAS gateway 320 is further validated against the control storage system 340.

Additionally, the control storage system 340 can help identify whether the file system entity or the object includes the correct data. Consider, for example, a scenario in which the validation of an object fails. It is possible that either the file system entity includes incorrect data or the object includes incorrect data. Thus, it may not be apparent whether the corresponding defect in the operation of the NAS gateway 320 occurred when reading data from the object store 330 or writing data to the object store 330. However, comparing the file system entity and the object to the corresponding file system entity stored in the control storage system 340 can identify whether the file system entity or the object contains incorrect data.

Although the example of FIG. 3 describes the use of the control storage system 340 in the context of dynamic validation of the NAS gateway 320, the control storage system 340 can be used for static validation as well. In particular, operations performed by the client 300 (not just the validation module 302) are performed on both the storage system 310 and the control storage system 340, similar to the operations performed by the validation module 302 at stages C1 and C2. The validation process can performed similarly to the validation process described in FIGS. 1 and 2.

Although FIGS. 1, 2, and 3 are described separately, a single validation module can include the functionality described in any combination of FIGS. 1, 2, and 3. For example, a validation module might be capable of performing static validation or dynamic validation depending on a particular configuration option. Similarly, the validation module might be capable of utilizing a control file system if one is available, or otherwise validating the operation of the NAS gateway without one if none is available.

Figure 4:
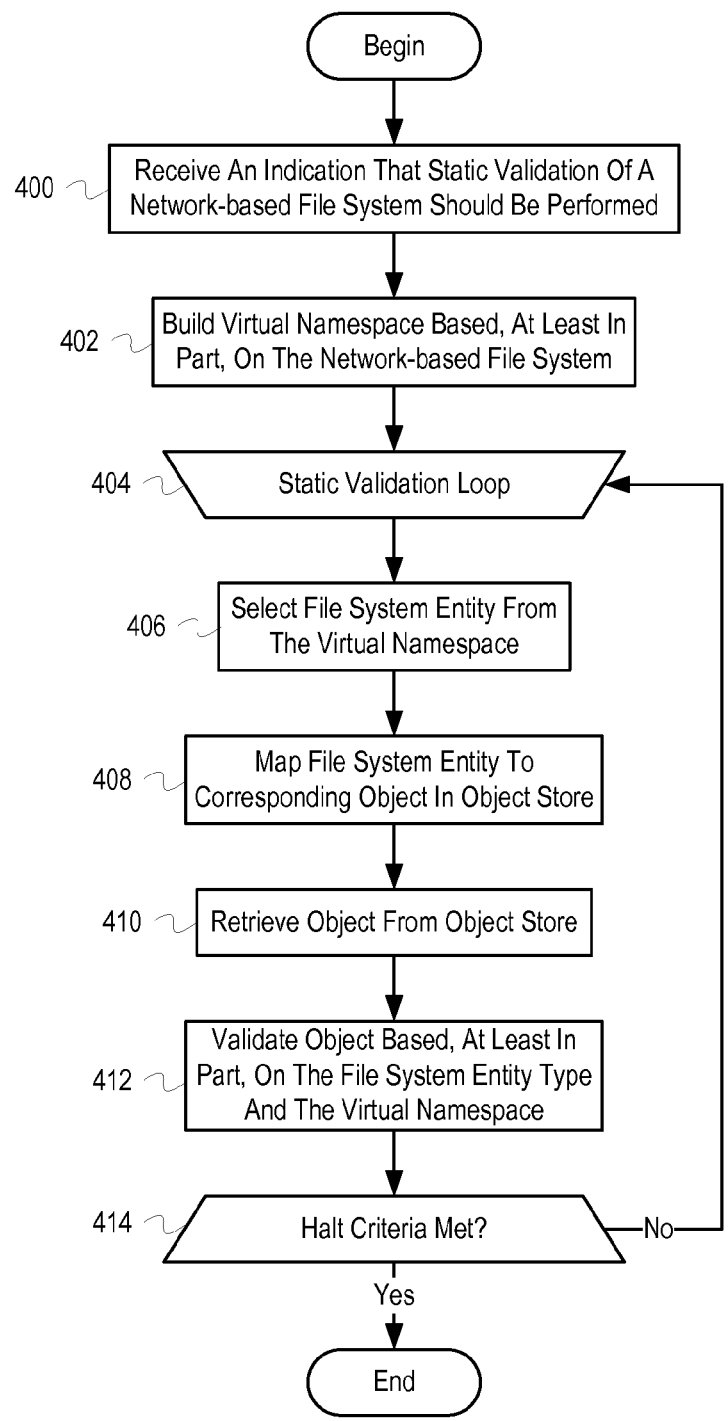
FIG. 4 depicts a flowchart of example operations for statically validating a NAS gateway.

FIG. 4 depicts a flowchart of example operations for statically validating a NAS gateway. The operations depicted in FIG. 4 can be performed by a validation module, such as the validation module 102 of FIG. 1, or any suitable component.

At block 400, a validation module receives an indication that static validation of a network-based file system should be performed. The indication may be implicit or explicit. For example, the validation module may comprise executable code configured to perform the static validation. The indication may thus be a request for the executable code to begin executing (e.g., in response to a command from another component or a user). As another example, the validation module may be configured to perform either static validation or dynamic validation based, at least in part, on a parameter received as part of a command to execute the executable code. Thus, the indication can be the parameter indicating that the static validation should be performed. After the validation module receives the indication that static validation of the network-based file system should be performed, control flows to block 402.

At block 402, the validation module builds a virtual namespace based, at least in part, on the network-based file system. The validation module builds the virtual namespace by traversing the network-based file system and storing metadata identifying file system entities of the network-based file system in a data structure. The metadata stored in the data structure can include entity identifiers (e.g., unique identifiers, paths, etc.), created and/or last modified timestamps, checksums, etc.). After the validation module builds the virtual namespace, control flows to block 404.

At block 404, the validation module begins an iteration of a static validation loop. On the first pass through block 404, the validation module may initialize one or more loop variables used during the static validation loop. On subsequent passes through block 404, the validation module may update the one or more loop variables. After the validation module initializes or updates the one or more loop variables, control flows to block 406.

At block 406, the validation module selects a file system entity from the virtual namespace. The operations performed by the validation module to select the file system entity from the virtual namespace can vary, as described above. For example, the validation module may select the next sequential file system entity, may randomly select another file system entity, or pseudo-randomly select another file system entity (e.g., using a weighted random selection technique). After the validation module selects the file system entity from the virtual namespace, control flows to block 408.

At block 408, the validation module maps the file system entity to a corresponding namespace object and data object in an object store. The particular operations performed to map the file system entity to the corresponding object can vary based on the file system entity type, the representation of the network-based file system in the object store, etc. Mapping the file system entity to the corresponding objects may include querying the object store for intermediate objects. For example, the validation module might identify an object corresponding to an inode associated with the file system entity. The validation module may retrieve the object corresponding to the inode and use data in the retrieved object to identify an object corresponding to the file system entity. After the validation module maps the file system entity to the corresponding objects in the object store, control flows to block 410.

At block 410, the validation module retrieves the objects from the object store. To retrieve the objects, the validation module can query the object store using identifiers associated with the objects. The validation module might not query the object store directly (e.g., the validation module may use an object store interface to query the object store). After the validation module retrieves the objects from the object store, control flows to block 412.

At block 412, the validation module validates the objects based, at least in part, on the file system entity type and the virtual namespace. As described above, file system entities can be various types, such as files, directories, links, etc. While some types of file system entities may have common characteristics that are validated, file system entity types can also have unique characteristics that differ from other file system entity types. Thus, the particular operations performed to validate a file system entity can be dependent on the file system entity type.

To validate the objects, the validation module compares the data of the objects with expected values associated with the virtual namespace. For example, the validation module may compare a last-modified timestamp stored with the objects (as object data or metadata) to a last-modified timestamp for the file system entity, which can be stored as metadata in the virtual namespace. As mentioned above, the particular comparisons can vary depending on the file system entity type and are described in more detail below. After the validation module validates the object, control flows to block 414.

At block 414, the validation module determines whether any halt criteria are met. If the validation module determines that a halt criterion is met, the process ends. If the validation module determines that no halt criterion is met, control flows back to block 404 and a new iteration of the static validation loop begins.

Figure 5:
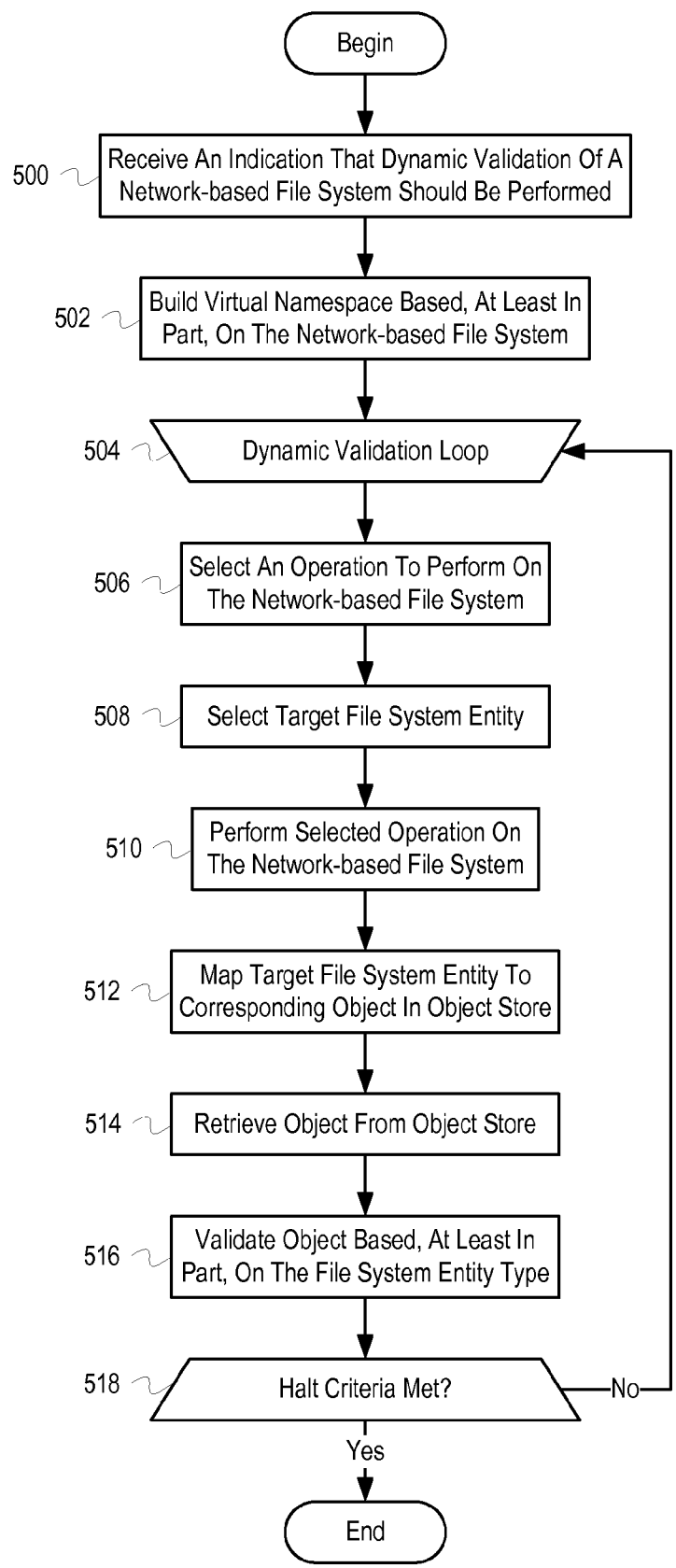
FIG. 5 depicts a flowchart of example operations for dynamically validating a NAS gateway.

FIG. 5 depicts a flowchart of example operations for dynamically validating a NAS gateway. The operations depicted in FIG. 5 can be performed by a validation module, such as the validation module 102 of FIG. 1, or any suitable component.

At block 500, a validation module receives an indication that dynamic validation of a network-based file system should be performed. The indication may be implicit or explicit. For example, the validation module may comprise executable code configured to perform the dynamic validation. The indication may thus be a request for the executable code to begin executing (e.g., in response to a command from another component or a user). As another example, the validation module may be configured to perform either static validation or dynamic validation based, at least in part, on a parameter received as part of a command to execute the executable code. Thus, the indication can be the parameter indicating that the dynamic validation should be performed. After the validation module receives the indication that dynamic validation of the network-based file system should be performed, control flows to block 502.

At block 502, the validation module builds a virtual namespace based, at least in part, on the network-based file system. The operations performed by the validation module to build the virtual namespace can be substantially similar to those described at block 402 of FIG. 4. After the validation module builds the virtual namespace, control flows to block 504.

At block 504, the validation module begins an iteration of a dynamic validation loop. On the first pass through block 504, the validation module may initialize one or more loop variables used during the dynamic validation loop. On subsequent passes through block 504, the validation module may update the one or more loop variables. After the validation module initializes or updates the one or more loop variables, control flows to block 506.

At block 506, the validation module selects an operation to perform on the network-based file system. To select the operation to perform, the validation module may select an operation from a list of available operations. The validation module may sequentially select operations from the list, randomly select operations, pseudo-randomly select operations (e.g., using a weighted random selection technique), etc. After the validation module selects the operation to perform on the network-based file system, control flows to block 508.

At block 508, the validation module selects a target file system entity. The target file system entity is an entity on which the operations selected at block 506 is performed. For example, if the operation selected at block 506 is a write operation, the validation module selects a file to write data to. In some instances, the validation module selects multiple target file system entities. For example, if the operation selected at block 506 is an operation to create a symbolic link, the validation module selects a file as the source and a directory in which to create the symbolic link. In some instances, the network-based file system itself, or metadata associated with the network-based file system, may be considered a file system entity. For example, if a particular operation only modifies file system metadata (e.g., does not affect a file system entity that is part of the network-based file system), metadata associated with the network-based file system may be selected as the target entity. Similarly, metadata associated with file system entities may be considered a file system entity apart from the file system entity itself. If multiple candidate file system entities are available (e.g., multiple files within the network-based file system may be written to), the validation module may select one or more of the multiple candidate file system entities randomly, pseudo-randomly, or based on various heuristics. After the validation module selects the target file system entity, control flows to block 510.

At block 510, the validation module performs the selected operation on the network-based file system. To perform the selected operation, the validation module may send an indication of the operation and any parameters (e.g., an identifier associated with the target file system entity) to an NFS interface. The indication may not be sent directly to the NFS interface; instead, the validation module may interface with an operating system using standard file system commands. The operating system may then pass the commands issued by the validation module to the NFS interface. After the validation module performs the selected operation on the network-based file system, control flows to block 512.

At block 512, the validation module maps the target file system entity to a corresponding namespace object and data object in an object store. To map the target file system entity to the corresponding objects, the validation module can perform operations substantially similar to those described at block 408 of FIG. 4. If multiple target file system entities were selected, the validation module can map each of the target file system entities to corresponding objects in the object store. After the validation module maps the target file system entity to the corresponding objects in the object store, control flows to block 514.

At block 514, the validation module retrieves the objects from the object store. To retrieve the objects, the validation module can query the object store using identifiers associated with the objects. The validation module might not query the object store directly (e.g., the validation module may use an object store interface to query the object store). After the validation module retrieves the object from the object store, control flows to block 516.

At block 516, the validation module validates the objects based, at least in part, on the file system entity type and the virtual namespace. To validate the objects, the validation module can perform operations substantially similar to those described at block 412 of FIG. 4. After the validation module validates the objects, control flows to block 518.

At block 518, the validation module determines whether any halt criteria are met. If the validation module determines that a halt criterion is met, the process ends. If the validation module determines that no halt criterion is met, control flows back to block 504 and a new iteration of the dynamic validation loop begins.

Although FIG. 5 depicts the validation of the object as occurring each time an operation is performed on the network-based file system, the validation module configuration can vary. For example, the validation module may select and perform more than one operation on the network-based file system prior to validating the target objects. Thus, the operations can be performed, and the associated target objects validated, in batches.

Figure 6:
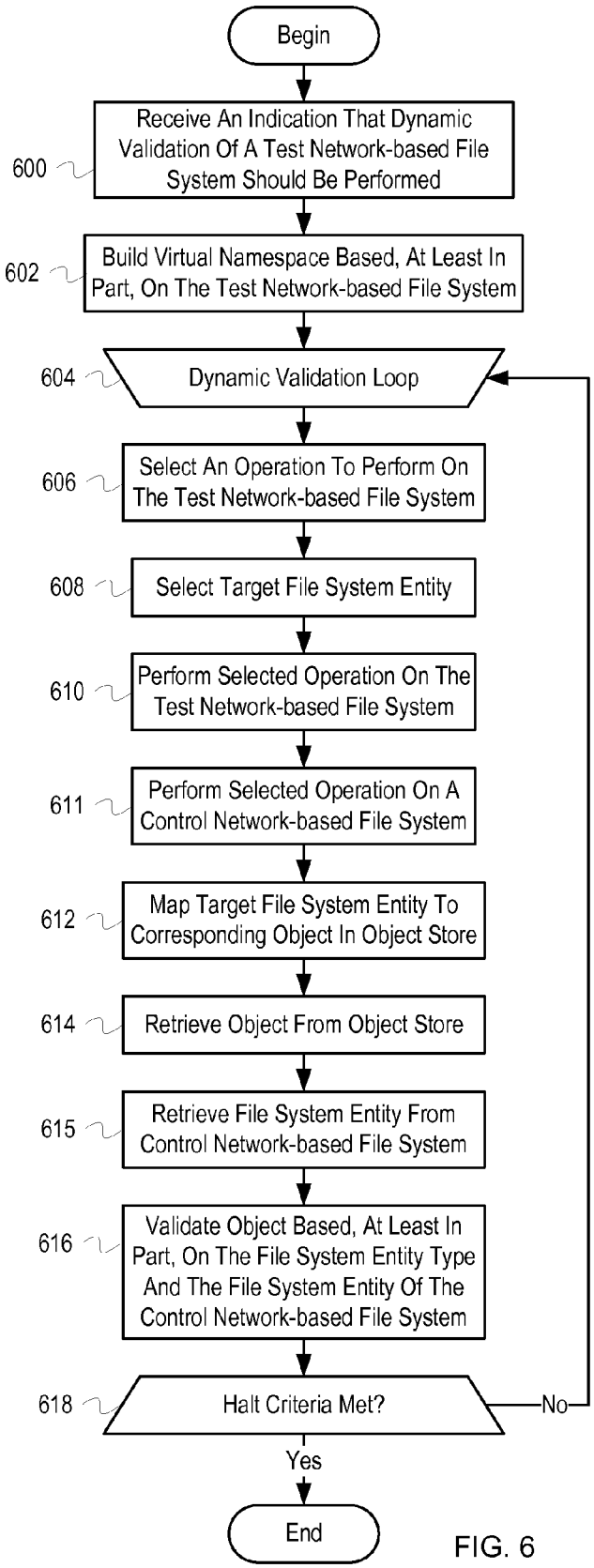
FIG. 6 depicts a flowchart of example operations for dynamically validating a NAS gateway using a control network-based file system.

FIG. 6 depicts a flowchart of example operations for dynamically validating a NAS gateway using a control network-based file system. The operations depicted in FIG. 6 can be performed by a validation module, such as the validation module 302 of FIG. 3, or any suitable component.

At block 600, a validation module receives an indication that dynamic validation of a test network-based file system should be performed. The indication may be implicit or explicit. For example, the validation module may comprise executable code configured to perform the dynamic validation. The indication may thus be a request for the executable code to begin executing (e.g., in response to a command from another component or a user). As another example, the validation module may be configured to perform either static validation or dynamic validation based, at least in part, on a parameter received as part of a command to execute the executable code. Thus, the indication can be the parameter indicating that the dynamic validation should be performed. After the validation module receives the indication that dynamic validation of the network-based file system should be performed, control flows to block 602.

At block 602, the validation module builds a virtual namespace based, at least in part, on the test network-based file system. The operations performed by the validation module to build the virtual namespace can be substantially similar to those described at block 402 of FIG. 4. After the validation module builds the virtual namespace, control flows to block 604.

At block 604, the validation module begins an iteration of a dynamic validation loop. On the first pass through block 604, the validation module may initialize one or more loop variables used during the dynamic validation loop. On subsequent passes through block 604, the validation module may update the one or more loop variables. After the validation module initializes or updates the one or more loop variables, control flows to block 606.

At block 606, the validation module selects an operation to perform on the test network-based file system. To select the operation to perform, the validation module may select an operation from a list of available operations. The validation module may sequentially select operations from the list, randomly select operations, pseudo-randomly select operations (e.g., using a weighted random selection technique), etc. After the validation module selects the operation to perform on the test network-based file system, control flows to block 608.

At block 608, the validation module selects a target file system entity. To select the target file system entity, the validation module can perform operations substantially similar to those described at block 508 of FIG. 5. After the validation module selects the target file system entity, control flows to block 610.

At block 610, the validation module performs the selected operation on the test network-based file system. To perform the selected operation, the validation module can perform operations substantially similar to those described at block 510 of FIG. 5. After the validation module performs the selected operation on the test network-based file system control flows to block 611.

At block 611, the validation module performs the selected operation on a control network-based file system. To perform the selected operation, the validation module can perform substantially similar operations to those described at block 610. However, the validation module identifies the control network-based file system instead of the test network-based file system. After the validation module performs the selected operation on the control network-based file system, control flows to block 612.

At block 612, the validation module maps the target file system entity to a corresponding namespace object and data object in an object store. To map the target file system entity to the corresponding objects, the validation module can perform operations substantially similar to those described at block 512 of FIG. 5. After the validation module maps the target file system entity to the corresponding objects in the object store, control flows to block 614.

At block 614, the validation module retrieves the objects from the object store. To retrieve the objects, the validation module can query the object store using an identifier associated with the objects. The validation module might not query the object store directly (e.g., the validation module may use an object store interface to query the object store). After the validation module retrieves the objects from the object store, control flows to block 615.

At block 615, the validation module retrieves the file system entity from the control network-based file system. To retrieve the file system entity from the control network-based file system, the validation module can send a read operation to an NFS interface. The NFS operation may not be sent to the NFS interface directly; instead, the validation module may interface with an operating system using standard file system commands. The operating system may then pass the commands issued by the validation module to the NFS interface. After the validation module retrieves the file system entity from the control network-based file system, control flows to block 616.

At block 616, the validation module validates the objects based, at least in part, on the file system entity type and the file system entity of the control network-based file system. In particular, the validation module can perform operations similar to those described at block 516 of FIG. 5. Additionally, the validation module validates the object against the file system entity retrieved from the control network-based file system. The operations performed by the validation module to validate the objects against the file system entity retrieved from the control network-based file system can be similar to the operations performed to validate the objects against the virtual namespace. After the validation module validates the objects, control flows to block 618.

At block 618, the validation module determines whether any halt criteria are met. If the validation module determines that a halt criterion is met, the process ends. If the validation module determines that no halt criterion is met, control flows back to block 604 and a new iteration of the dynamic validation loop begins.

As mentioned above, the operations performed to validate an object can vary based on the type of file system entity the object corresponds to. For example, the operations performed to validate an object corresponding to a directory may differ from the operations performed to validate an object corresponding to a file. FIGS. 7 through 11 depict flowcharts of example operations for validating various file system entity types. The examples described above can incorporate some or all of the operations described in FIGS. 7 through 11 as appropriate.

Figure 7:
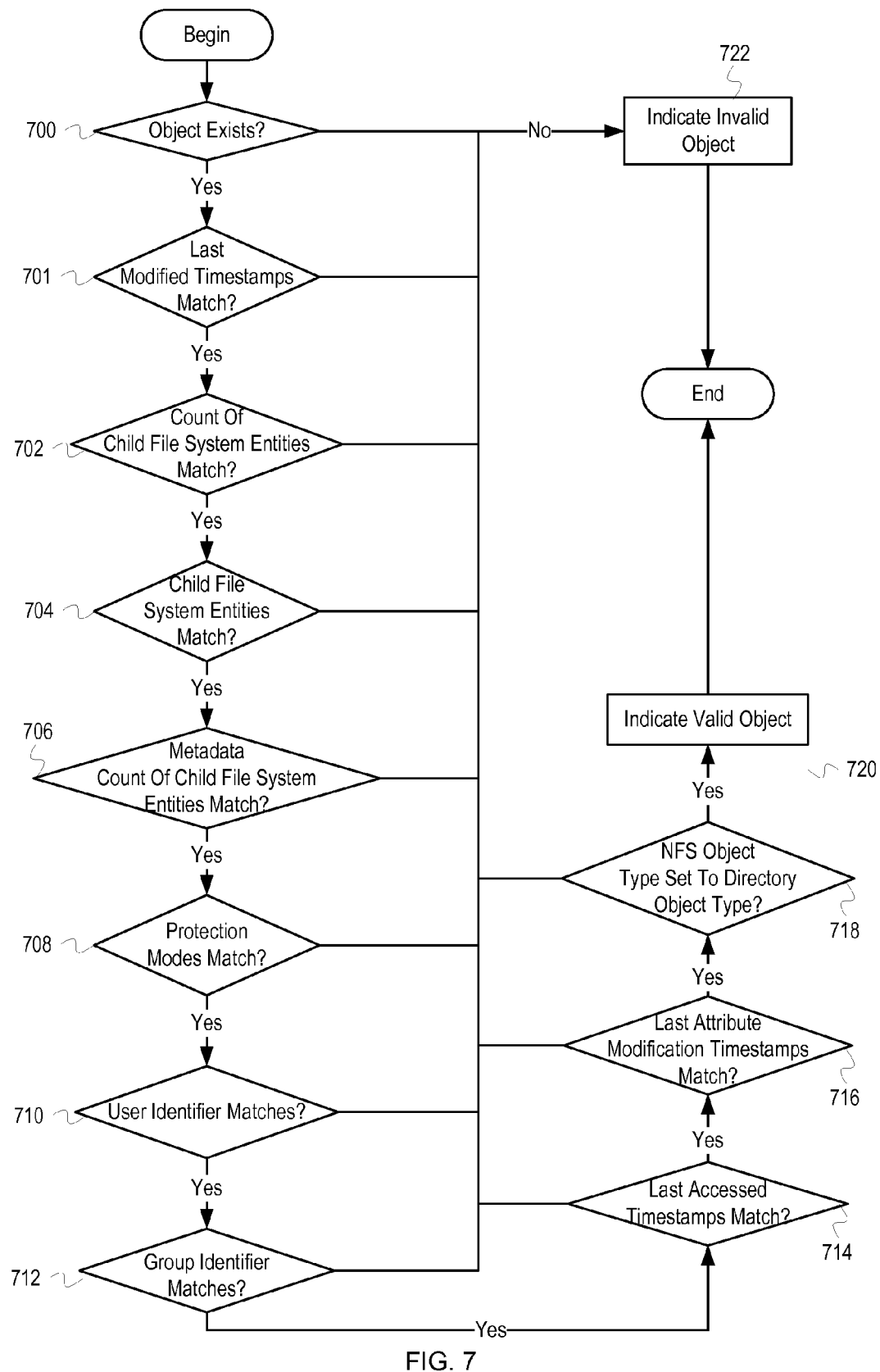
FIG. 7 depicts a flowchart of example operations for validating an object corresponding to a directory file system entity.

FIG. 7 depicts a flowchart of example operations for validating an object corresponding to a directory file system entity. The operations depicted in FIG. 7 can be performed by a validation module, such as the validation module 102 of FIG. 1, or any suitable component. The operations depicted in FIG. 7 assume that the component performing the operations can access data associated with a particular directory file system. To avoid obfuscating the example, the description will consider the namespace object and the data object a single object.

At block 700, a validation module determines whether an object to be validated (hereinafter "object") exists. The validation module can determine whether the object exists based on the results of querying an object store for the object. If the object store returns no results or an error, the validation module determines that the object does not exist. If the validation module determines that the object exists, control flows to block 701. If the validation module determines that the object does not exist, control flows to block 722.

At block 701, the validation module determines whether the last modified timestamp of an object to be validated (hereinafter "object") matches a last modified timestamp of a corresponding directory. The validation module can read the last modified timestamp of the object from metadata associated with the object. The object metadata can be stored separately (e.g., in a distinct object) from the object itself. The validation module can read the last modified timestamp of the directory from file system metadata associated with a virtual namespace that represents a network-based file system. If the last modified timestamp of the object matches the last modified timestamp of the directory, control flows to block 702. If the last modified timestamp of the object does not match the last modified timestamp of the directory, control flows to block 722.

At block 702, the validation module determines whether a count of child file system entities associated with the object matches a count of child file system entities associated with the directory. The validation module determines the count of child file system entities associated with the object by counting the children identified in the object. For example, the data object corresponding to the directory may include a list of inodes that identify children of the directory. The validation module may iterate over the list and count the number of inodes in the list. Similarly, the validation object can determine the count of children associated with the file system entity by performing similar operations on data associated with the file system entity. If the count of child file system entities associated with the object matches the count of child file system entities associated with the directory, control flows to block 704. If the count of child file system entities associated with the object does not match the count of child file system entities associated with the directory, control flows to block 722.

At block 704, the validation module determines whether the child file system entities associated with the object match the child file system entities associated with the directory. To determine whether the child file system entities associated with the object match the child file system entities associated with the directory, the validation module can iterate over metadata associated with each of the child file system entities and compare the metadata. For example, the validation module may repeatedly select a child file system entity from a list of child file system entities associated with the object and determine whether a list of child file system entities associated with the directory includes a file system entity with a name that matches the selected child file system entity. If either list contains a child file system entity that the other list does not, the validation module determines that the child file system entities do not match. If the validation module determines that the child file system entities associated with the object match the child file system entities associated with the directory, control flows to block 706. If the validation module determines that the child file system entities associated with the object do not match the child file system entities associated with the directory, control flows to block 722.

At block 706, the validation module determines whether a count of child file system entities specified in metadata associated with the object matches a count of child file system entities specified in metadata associated with the file system entity. For example, metadata associated with the file system entity may include a field that specifies the count of child file system entities. Metadata associated with the object can include a similar field. The operations performed at block 706 differ from the operations performed at block 702 inasmuch as the operations performed at block 702 count the actual child file system entities, while the operations performed at block 706 compare metadata fields that specify the number of child system entities (i.e., without counting the actual number of child file system entities). If the validation module determines that the count of child file system entities specified in metadata associated with the object matches the count of child file system entities specified in metadata associated with the file system entity, control flows to block 708. If the validation module determines that the count of child file system entities specified in metadata associated with the object does not match the count of child file system entities specified in metadata associated with the file system entity, control flows to block 722.

At block 708, the validation module determines whether protection mode(s) associated with the object match protection mode(s) associated with the directory. The protection mode(s) can be included in the respective metadata, and may be represented as bit flags, integers, etc. If the validation module determines that the protection mode(s) associated with the object match the protection mode(s) associated with the directory, control flows to block 710. If the validation module determines that the protection mode(s) associated with the object do not match the protection mode(s) associated with the directory, control flows to block 722.

At block 710, the validation module determines whether the user identifier assigned to the object match the user identifier assigned to the directory. The user identifier can be included in the respective metadata. If the validation unit determines that the user identifier assigned to the object match the user identifier assigned to the directory, control flows to block 712. If the validation unit determines that the user identifier assigned to the object do no match the user identifier assigned to the directory, control flows to block 722.

At block 712, the validation module determines whether the group identifier assigned to the object match the group identifier assigned to the directory. The group identifier can be included in the respective metadata. If the validation unit determines that the group identifier assigned to the object match the group identifier assigned to the directory, control flows to block 714. If the validation unit determines that the group identifier assigned to the object do not match the group identifier assigned to the directory, control flows to block 722.

At block 714, the validation module determines whether a last accessed timestamp associated with the object matches a last accessed timestamp associated with the directory. The last accessed timestamps can be included in the respective metadata. If the validation unit determines that the last accessed timestamp associated with the object matches the last accessed timestamp associated with the directory, control flows to block 716. If the validation unit determines that the last accessed timestamp associated with the object does not match the last accessed timestamp associated with the directory, control flows to block 722.

At block 716, the validation module determines whether a last attribute modification timestamp associated with the object matches a last attribute modification timestamp associated with the directory. The last attribute modification timestamps can be included in the respective metadata. If the validation unit determines that the last attribute modification timestamp associated with the object matches the last attribute modification timestamp associated with the directory, control flows to block 718. If the validation unit determines that the last attribute modification timestamp associated with the object does not match the last attribute modification timestamp associated with the directory, control flows to block 722.

At block 718, the validation module determines whether an NFS object type associated with the object matches a defined NFS object type for directories. In other words, file system entities can be associated with NFS object types that correspond to the available types, such as files, directories, etc. The validation module can compare an NFS object type value associated with the object (e.g., stored in the object metadata) and determine whether the value matches the value defined by the NFS protocol for directories. If the NFS object type associated with the object matches the defined NFS object type for directories, control flows to block 720. If the NFS object type associated with the object does not match the defined NFS object type for directories, control flows to block 722.

At block 720, the validation module indicates that the object is valid. The particular technique used to indicate that the object is valid can vary. For example, the validation module may implicitly indicate that the object is valid by not halting the validation process or may explicitly return a value indicating the object is valid (e.g., "true"). After the validation module indicates that the object is valid, the process ends.

Control flowed to block 722 from any of blocks 700 through 718 if the validation module failed to validate the object. At block 722, the validation module indicates that the object is invalid. The particular technique used to indicate that the object is invalid can vary. For example, the validation module may log an error and halt the validation process or may return a value indicating that the object is invalid (e.g., "false"). After the validation module indicates that the object is invalid, the process ends.

Figure 8:
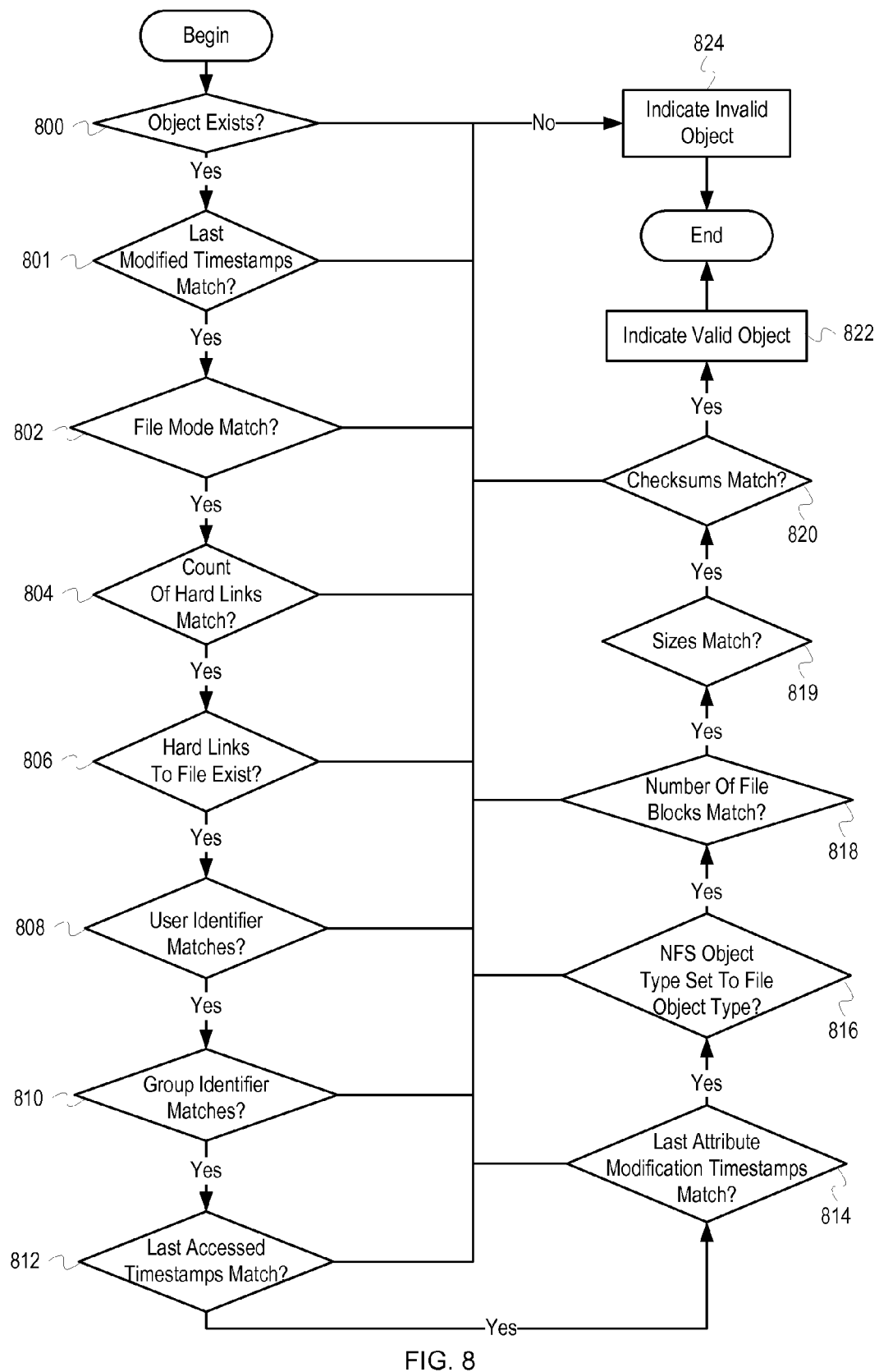
FIG. 8 depicts a flowchart of example operations for validating an object corresponding to a file file system entity.

FIG. 8 depicts a flowchart of example operations for validating an object corresponding to a file file system entity. The operations depicted in FIG. 8 can be performed by a validation module, such as the validation module 102 of FIG. 1, or any suitable component. The operations depicted in FIG. 8 assume that the component performing the operations can access data associated with a particular file file system entity.

To avoid obfuscating the example, the description will consider the namespace object and the data object a single object.

At block 800, a validation module determines whether an object to be validated (hereinafter "object") exists. The validation module can determine whether the object exists based on the results of querying an object store for the object. If the object store returns no results or an error, the validation module determines that the object does not exist. If the validation module determines that the object exists, control flows to block 801. If the validation module determines that the object does not exist, control flows to block 824.

At block 801, the validation module determines whether the last modified timestamp of the object matches a last modified timestamp of a corresponding file. The validation module can read the last modified timestamp of the object from metadata associated with the object. The object metadata can be stored separately (e.g., in a distinct object) from the object itself. The validation module can read the last modified timestamp of the file from file system metadata associated with a virtual namespace that represents a network-based file system. If the last modified timestamp of the object matches the last modified timestamp of the file, control flows to block 802. If the last modified timestamp of the object does not match the last modified timestamp of the file, control flows to block 824.

At block 802, the validation module determines whether file mode(s) associated with the object match file mode(s) associated with the file. The file mode(s) can be included in the respective metadata, and may be represented as bit flags, integers, etc. If the validation module determines that the file mode(s) associated with the object match the file mode(s) associated with the file, control flows to block 804. If the validation module determines that the file mode(s) associated with the object do not match the file mode(s) associated with the file, control flows to block 824.

At block 804, the validation module determines whether a count of hard links that reference the object matches a count of hard links that reference the file. The count of hard links can be included in the respective metadata. If the validation module determines that the count of hard links that reference the object matches the count of hard links that reference the file, control flows to block 806. If the validation module determines that the count of hard links that reference the object does not match the count of hard links that reference the file, control flows to block 824.

At block 806, the validation module determines whether objects corresponding to the hard links that reference the file exist in the object store. In particular, the validation module identifies the paths to any hard links that reference the file and determines whether objects associated with the individual hard links are located in the object store. If the validation module determines that the objects corresponding to the hard links that reference the file exist in the object store, control flows to block 808. If the validation module determines that the objects corresponding to the hard links that reference the file do not exist in the object store, control flows to block 824.

At block 808, the validation module determines whether the user identifier assigned to the object match the user identifier assigned to the file. The user identifier can be included in the respective metadata. If the validation unit determines that the user identifier assigned to the object match the user identifier assigned to the file, control flows to block 810. If the validation unit determines that the user identifier assigned to the object do no match the user identifier assigned to the file, control flows to block 824.

At block 810, the validation module determines whether the group identifier assigned to the object match the group identifier assigned to the file. The group identifier can be included in the respective metadata. If the validation unit determines that the group identifier assigned to the object match the group identifier assigned to the file, control flows to block 812. If the validation unit determines that the group identifier assigned to the object do not match the group identifier assigned to the file, control flows to block 824.

At block 812, the validation module determines whether a last accessed timestamp associated with the object matches a last accessed timestamp associated with the file. The last accessed timestamps can be included in the respective metadata. If the validation unit determines that the last accessed timestamp associated with the object matches the last accessed timestamp associated with the file, control flows to block 814. If the validation unit determines that the last accessed timestamp associated with the object does not match the last accessed timestamp associated with the file, control flows to block 824.

At block 814, the validation module determines whether a last attribute modification timestamp associated with the object matches a last attribute modification timestamp associated with the file. The last attribute modification timestamps can be included in the respective metadata. If the validation unit determines that the last attribute modification timestamp associated with the object matches the last attribute modification timestamp associated with the file, control flows to block 816. If the validation unit determines that the last attribute modification timestamp associated with the object does not match the last attribute modification timestamp associated with the file, control flows to block 824.

At block 816, the validation module determines whether an NFS object type associated with the object matches a defined NFS object type for files. The NFS object type can be included in the respective metadata or configured as part of the validation module. If the NFS object type associated with the object matches the defined NFS object type for files, control flows to block 818. If the NFS object type associated with the object does not match the defined NFS object type for files, control flows to block 824.

At block 818, the validation module determines whether a count of blocks that comprise the object matches an expected count of blocks. The expected count of blocks can be determined by dividing the size of the object data by the configured block size. The configured block size can be stored as part of the object metadata. If the count of blocks that comprise the object matches the expected count of blocks, control flows to block 819. If the count of blocks that comprise the object does not match the expected count of blocks, control flows to block 824.

At block 819, the validation module determines whether a size of the object's data matches the size of the file. The sizes can be stored as part of the respective metadata. If the validation module determines that the size of the object's data matches the size of the file, control flows to block 820. If the validation module determines that the size of the object does not match the size of the link, control flows to block 824.

At block 820, the validation module determines whether a checksum for the object matches a checksum for the file. The checksums can be stored as part of the respective metadata or can be calculated based on the respective data. If the validation module determines that the checksum for the object matches the checksum for the file, control flows to block 822. If the validation module determines that the checksum for the object does not match the checksum for the file, control flows to block 824.

At block 822, the validation module indicates that the object is valid. The particular technique used to indicate that the object is valid can vary. For example, the validation module may implicitly indicate that the object is valid by not halting the validation process or may explicitly return a value indicating the object is valid (e.g., "true"). After the validation module indicates that the object is valid, the process ends.

At block 824, the validation module indicates that the object is invalid. The particular technique used to indicate that the object is invalid can vary. For example, the validation module may log an error and halt the validation process or may return a value indicating that the object is invalid (e.g., "false"). After the validation module indicates that the object is invalid, the process ends.

In some instances, the validation module may perform different operations to calculate and/or validate the checksum of the object. For example, an object store may implement partial writes to objects. Thus, instead of writing an entire object, a portion less than the entire object may be written. In such instances, the checksum associated with the object may be a composite checksum based on data from each of the write operations performed on the object. The validation module can determine whether the checksum is a composite checksum and, if so, calculate a similar composite checksum. In some instances, the validation module may not be able to calculate the checksum, and thus may read the object data itself and calculate a checksum of the object or may skip validation of the checksum.

Figure 9:
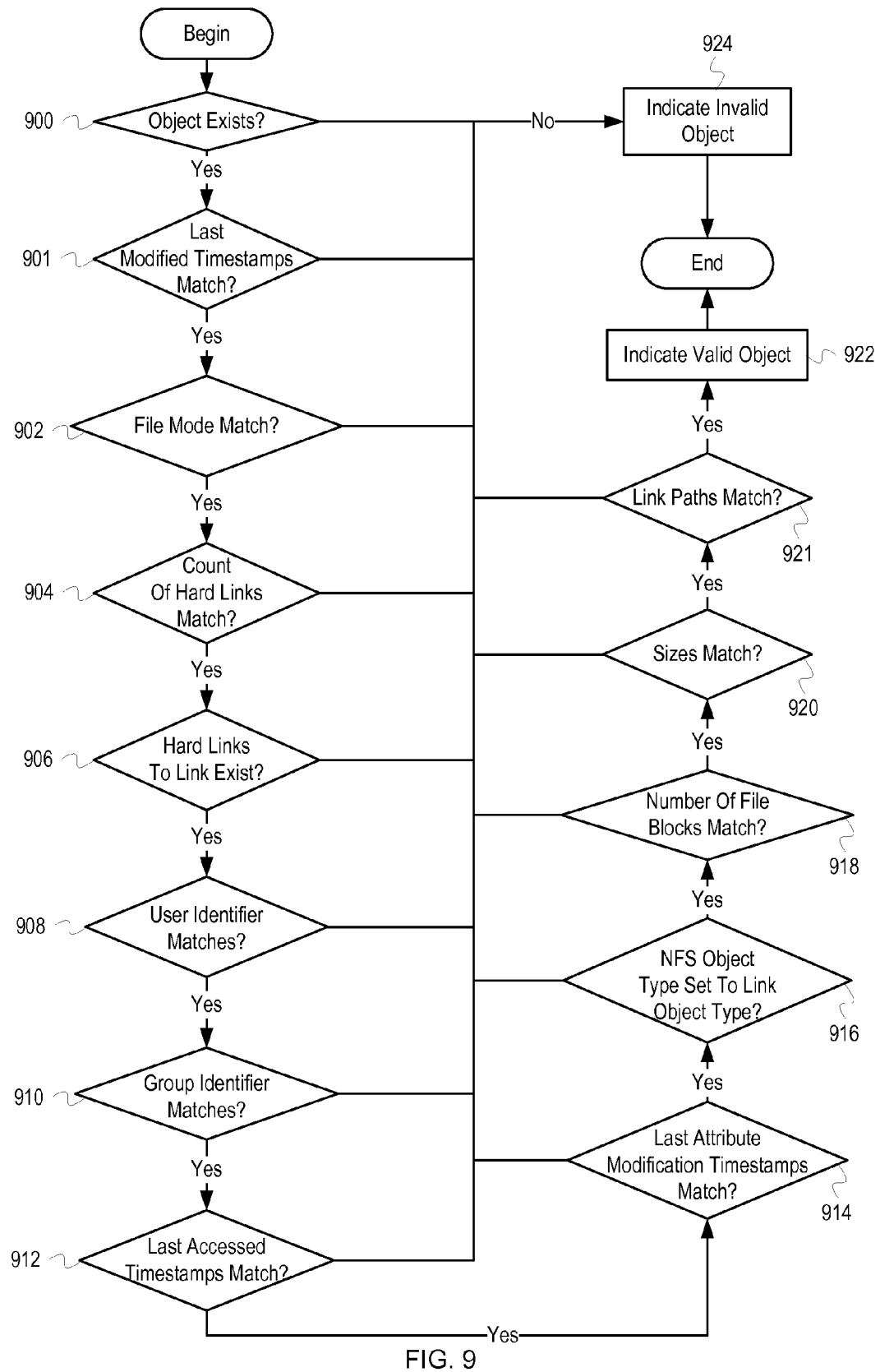
FIG. 9 depicts a flowchart of example operations for validating an object corresponding to a symbolic link file system entity.

FIG. 9 depicts a flowchart of example operations for validating an object corresponding to a symbolic link file system entity. The operations depicted in FIG. 9 can be performed by a validation module, such as the validation module 102 of FIG. 1, or any suitable component. The operations depicted in FIG. 9 assume that the component performing the operations can access data associated with a particular symbolic link file system entity. To avoid obfuscating the example, the description will consider the namespace object and the data object a single object.

At block 900, a validation module determines whether an object to be validated (hereinafter "object") exists. The validation module can determine whether the object exists based on the results of querying an object store for the object. If the object store returns no results or an error, the validation module determines that the object does not exist. If the validation module determines that the object exists, control flows to block 901. If the validation module determines that the object does not exist, control flows to block 924.

At block 901, the validation module determines whether the last modified timestamp of the object matches a last modified timestamp of a corresponding symbolic link. The validation module can read the last modified timestamp of the object from metadata associated with the object. The object metadata can be stored separately (e.g., in a distinct object) from the object itself. The validation module can read the last modified timestamp of the link from file system metadata associated with a virtual namespace that represents a network-based file system. If the last modified timestamp of the object matches the last modified timestamp of the symbolic link, control flows to block 902. If the last modified timestamp of the object does not match the last modified timestamp of the link, control flows to block 924.

At block 902, the validation module determines whether file mode(s) associated with the object match file mode(s) associated with the symbolic link. The file mode(s) can be included in the respective metadata, and may be represented as bit flags, integers, etc. If the validation module determines that the file mode(s) associated with the object match the file mode(s) associated with the symbolic link, control flows to block 904. If the validation module determines that the file mode(s) associated with the object do not match the file mode(s) associated with the symbolic link, control flows to block 924.

At block 904, the validation module determines whether a count of hard links that reference the object matches a count of hard links that reference the symbolic link. The count of hard links can be included in the respective metadata. If the validation module determines that the count of hard links that reference the object matches the count of hard links that reference the symbolic link, control flows to block 906. If the validation module determines that the count of hard links that reference the object does not match the count of hard links that reference the symbolic link, control flows to block 924.

At block 906, the validation module determines whether objects corresponding to the hard links that reference the symbolic link exist in the object store. In particular, the validation module identifies the paths to any hard links that reference the symbolic link and determines whether objects associated with the individual hard links are located in the object store. If the validation module determines that the objects corresponding to the hard links that reference the symbolic link exist in the object store, control flows to block 908. If the validation module determines that the objects corresponding to the hard links that reference the symbolic link do not exist in the object store, control flows to block 924.

At block 908, the validation module determines whether the user identifier assigned to the object match the user identifier assigned to the symbolic link. The user identifier can be included in the respective metadata. If the validation unit determines that the user identifier assigned to the object match the user identifier assigned to the symbolic link, control flows to block 910. If the validation unit determines that the user identifier assigned to the object do no match the user identifier assigned to the symbolic link, control flows to block 924.

At block 910, the validation module determines whether the group identifier assigned to the object match the group identifier assigned to the symbolic link. The group identifier can be included in the respective metadata. If the validation unit determines that the group identifier assigned to the object match the group identifier assigned to the symbolic link, control flows to block 912. If the validation unit determines that the group identifier assigned to the object do not match the group identifier assigned to the symbolic link, control flows to block 924.

At block 912, the validation module determines whether a last accessed timestamp associated with the object matches a last accessed timestamp associated with the symbolic link. The last accessed timestamps can be included in the respective metadata. If the validation unit determines that the last accessed timestamp associated with the object matches the last accessed timestamp associated with the symbolic link, control flows to block 914. If the validation unit determines that the last accessed timestamp associated with the object does not match the last accessed timestamp associated with the symbolic link, control flows to block 924.

At block 914, the validation module determines whether a last attribute modification timestamp associated with the object matches a last attribute modification timestamp associated with the symbolic link. The last attribute modification timestamps can be included in the respective metadata. If the validation unit determines that the last attribute modification timestamp associated with the object matches the last attribute modification timestamp associated with the symbolic link, control flows to block 916. If the validation unit determines that the last attribute modification timestamp associated with the object does not match the last attribute modification timestamp associated with the symbolic link, control flows to block 924.

At block 916, the validation module determines whether an NFS object type associated with the object matches a defined NFS object type for symbolic links. The NFS object type can be included in the respective metadata or configured as part of the validation module. If the NFS object type associated with the object matches the defined NFS object type for symbolic links, control flows to block 918. If the NFS object type associated with the object does not match the defined NFS object type for symbolic links, control flows to block 924.

At block 918, the validation module determines whether a count of blocks that comprise the object matches an expected count of blocks. The expected count of blocks can be determined by dividing the size of the object data by the configured block size. The configured block size can be stored as part of the object metadata. If the count of blocks that comprise the object matches the expected count of blocks, control flows to block 920. If the count of blocks that comprise the object does not match the expected count of blocks, control flows to block 924.

At block 920, the validation module determines whether a size of the object matches a size of the symbolic link. The sizes can be stored as part of the respective metadata. If the validation module determines that the size of the object matches the size of the symbolic link, control flows to block 921. If the validation module determines that the size of the object does not match the size of the symbolic link, control flows to block 924.

At block 921, the validation module determines whether the symbolic link path specified by the object matches the symbolic link path specified by the file system entity. In other words, the validation module determines whether the link specified in the object references the same target file system entity as the link specified by the file system entity. If the validation module determines that the symbolic link path specified by the object matches the symbolic link path specified by the file system entity, control flows to block 922. If the validation module determines that the symbolic link path specified by the object does not match the symbolic link path specified by the file system entity, control flows to block 924.

At block 922, the validation module indicates that the object is valid. The particular technique used to indicate that the object is valid can vary. For example, the validation module may implicitly indicate that the object is valid by not halting the validation process or may explicitly return a value indicating the object is valid (e.g., "true"). After the validation module indicates that the object is valid, the process ends.

At block 924, the validation module indicates that the object is invalid. The particular technique used to indicate that the object is invalid can vary. For example, the validation module may log an error and halt the validation process or may return a value indicating that the object is invalid (e.g., "false"). After the validation module indicates that the object is invalid, the process ends.

Figure 10:
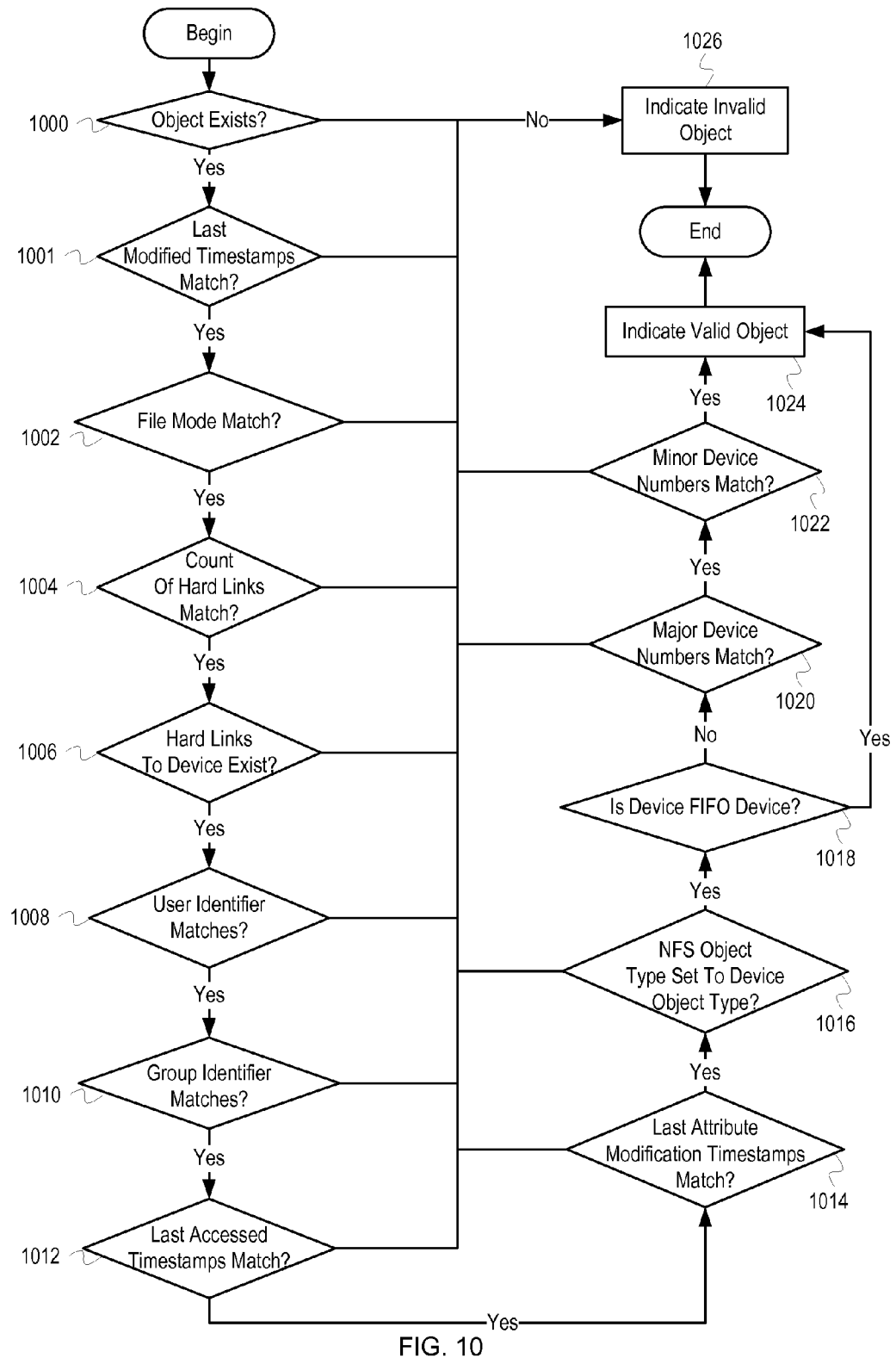
FIG. 10 depicts a flowchart of example operations for validating an object corresponding to a device file system entity.

FIG. 10 depicts a flowchart of example operations for validating an object corresponding to a device file system entity. The operations depicted in FIG. 10 can be performed by a validation module, such as the validation module 102 of FIG. 1, or any suitable component. The operations depicted in FIG. 10 assume that the component performing the operations can access data associated with a particular device file system entity. To avoid obfuscating the example, the description will consider the namespace object and the data object a single object.

At block 1000, a validation module determines whether an object to be validated (hereinafter "object") exists. The validation module can determine whether the object exists based on the results of querying an object store for the object. If the object store returns no results or an error, the validation module determines that the object does not exist. If the validation module determines that the object exists, control flows to block 1001. If the validation module determines that the object does not exist, control flows to block 1026.

At block 1001, the validation module determines whether the last modified timestamp of the object matches a last modified timestamp of a corresponding device. The validation module can read the last modified timestamp of the object from metadata associated with the object. The object metadata can be stored separately (e.g., in a distinct object) from the object itself. The validation module can read the last modified timestamp of the device from file system metadata associated with a virtual namespace that represents a network-based file system. If the last modified timestamp of the object matches the last modified timestamp of the device, control flows to block 1002. If the last modified timestamp of the object does not match the last modified timestamp of the device, control flows to block 1026.

At block 1002, the validation module determines whether file mode(s) associated with the object match file mode(s) associated with the device. The file mode(s) can be included in the respective metadata, and may be represented as bit flags, integers, etc. If the validation module determines that the file mode(s) associated with the object match the file mode(s) associated with the device, control flows to block 1004. If the validation module determines that the file mode(s) associated with the object do not match the file mode(s) associated with the device, control flows to block 1026.

At block 1004, the validation module determines whether a count of hard links that reference the object matches a count of hard links that reference the device. The count of hard links can be included in the respective metadata. If the validation module determines that the count of hard links that reference the object matches the count of hard links that reference the device, control flows to block 1006. If the validation module determines that the count of hard links that reference the object does not match the count of hard links that reference the device, control flows to block 1026.

At block 1006, the validation module determines whether objects corresponding to the hard links that reference the device exist in the object store. In particular, the validation module identifies the paths to any hard links that reference the device and determines whether objects associated with the individual hard links are located in the object store. If the validation module determines that the objects corresponding to the hard links that reference the device exist in the object store, control flows to block 1008. If the validation module determines that the objects corresponding to the hard links that reference the device do not exist in the object store, control flows to block 1026.

At block 1008, the validation module determines whether the user identifier assigned to the object match the user identifier assigned to the device. The user identifier can be included in the respective metadata. If the validation unit determines that the user identifier assigned to the object match the user identifier assigned to the device, control flows to block 1010. If the validation unit determines that the user identifier assigned to the object do no match the user identifier assigned to the device, control flows to block 1026.

At block 1010, the validation module determines whether the group identifier assigned to the object match the group identifier assigned to the device. The group identifier can be included in the respective metadata. If the validation unit determines that the group identifier assigned to the object match the group identifier assigned to the device, control flows to block 1012. If the validation unit determines that the group identifier assigned to the object do not match the group identifier assigned to the device, control flows to block 1026.

At block 1012, the validation module determines whether a last accessed timestamp associated with the object matches a last accessed timestamp associated with the device. The last accessed timestamps can be included in the respective metadata. If the validation unit determines that the last accessed timestamp associated with the object matches the last accessed timestamp associated with the device, control flows to block 1014. If the validation unit determines that the last accessed timestamp associated with the object does not match the last accessed timestamp associated with the device, control flows to block 1026.

At block 1014, the validation module determines whether a last attribute modification timestamp associated with the object matches a last attribute modification timestamp associated with the device. The last attribute modification timestamps can be included in the respective metadata. If the validation unit determines that the last attribute modification timestamp associated with the object matches the last attribute modification timestamp associated with the device, control flows to block 1016. If the validation unit determines that the last attribute modification timestamp associated with the object does not match the last attribute modification timestamp associated with the device, control flows to block 1026.

At block 1016, the validation module determines whether an NFS object type associated with the object matches a defined NFS object type for devices. The NFS object type can be included in the respective metadata or configured as part of the validation module. In some configurations, the NFS protocol may specify multiple device types (e.g., first-in-first-out ("FIFO"), character, or block devices). In such instances, the validation module may determine whether the NFS object type associated with the object matches one of the available device types. If the NFS object type associated with the object matches the defined NFS object type for devices, control flows to block 1018. If the NFS object type associated with the object does not match the defined NFS object type for devices, control flows to block 1026.

At block 1018, the validation module determines whether the device is a FIFO device. To determine whether the device is a FIFO device, the validation module compares the NFS object type associated with the object to the NFS object type defined for FIFO devices by the NFS protocol. If the validation module determines that the device is not a FIFO device, control flows to block 1020. If the validation module determines that the device is a FIFO device, control flows to block 1024.

At block 1020, the validation module determines whether a major device number assigned to the object match a major device number assigned to the device. The major device numbers can be included in the respective metadata. If the validation unit determines that the major device number assigned to the object matches the major device number assigned to the device, control flows to block 1022. If the validation unit determines that the major device number assigned to the object does not match the major device number assigned to the device, control flows to block 1026.

At block 1022, the validation module determines whether a minor device number assigned to the object match a minor device number assigned to the device. The minor device numbers can be included in the respective metadata. If the validation unit determines that the minor device number assigned to the object matches the minor device number assigned to the device, control flows to block 1024. If the validation unit determines that the minor device number assigned to the object does not match the minor device number assigned to the device, control flows to block 1026.

At block 1024, the validation module indicates that the object is valid. The particular technique used to indicate that the object is valid can vary. For example, the validation module may implicitly indicate that the object is valid by not halting the validation process or may explicitly return a value indicating the object is valid (e.g., "true"). After the validation module indicates that the object is valid, the process ends.

At block 1026, the validation module indicates that the object is invalid. The particular technique used to indicate that the object is invalid can vary. For example, the validation module may log an error and halt the validation process or may return a value indicating that the object is invalid (e.g., "false"). After the validation module indicates that the object is invalid, the process ends.

Figure 11:
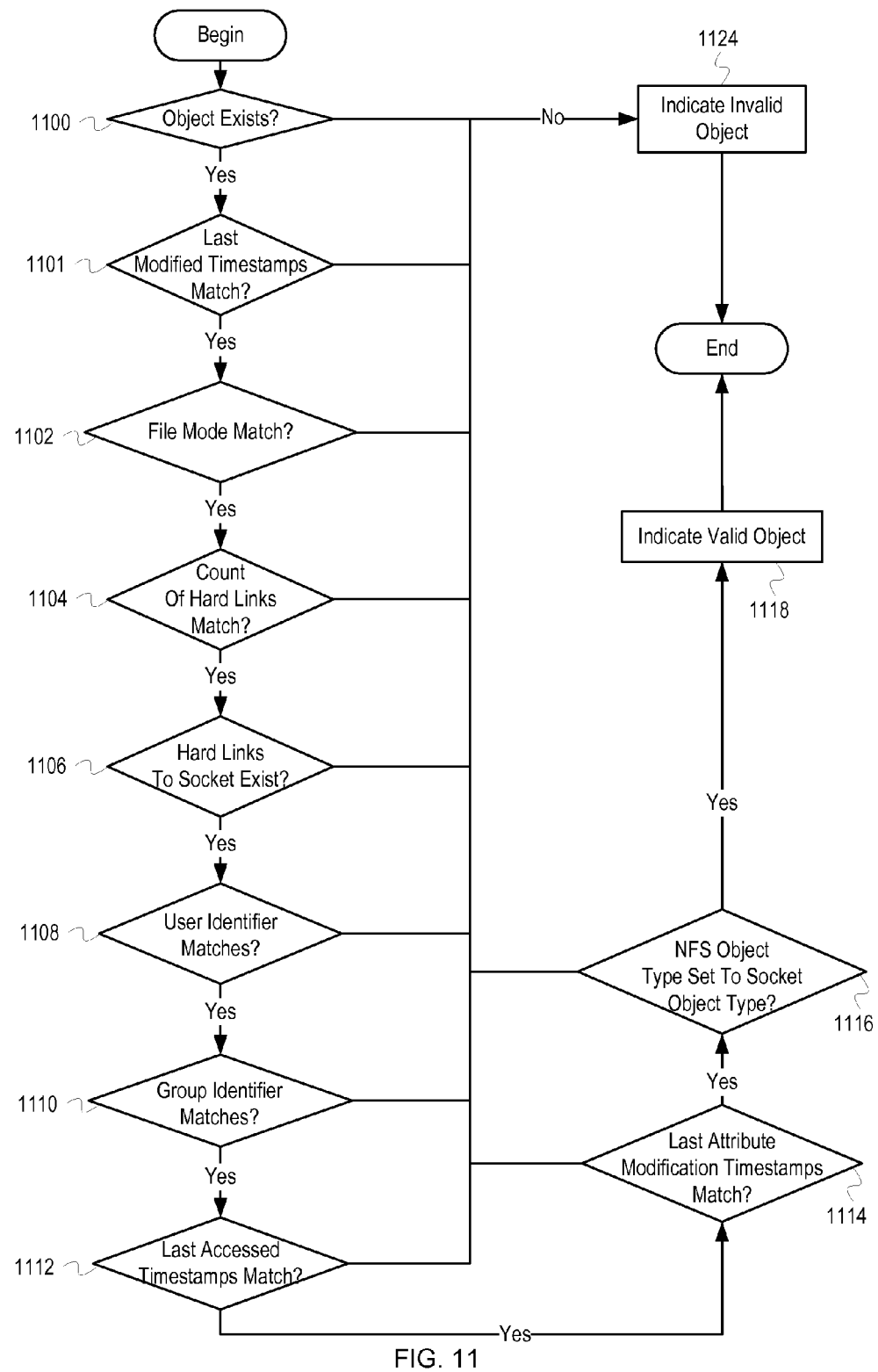
FIG. 11 depicts a flowchart of example operations for validating an object corresponding to a socket file system entity.

FIG. 11 depicts a flowchart of example operations for validating an object corresponding to a socket file system entity. The operations depicted in FIG. 11 can be performed by a validation module, such as the validation module 102 of FIG. 1, or any suitable component. The operations depicted in FIG. 11 assume that the component performing the operations can access data associated with a particular socket file system entity. To avoid obfuscating the example, the description will consider the namespace object and the data object a single object.

At block 1100, a validation module determines whether an object to be validated (hereinafter "object") exists. The validation module can determine whether the object exists based on the results of querying an object store for the object. If the object store returns no results or an error, the validation module determines that the object does not exist. If the validation module determines that the object exists, control flows to block 1101. If the validation module determines that the object does not exist, control flows to block 1124.

At block 1101, the validation module determines whether the last modified timestamp of the object matches a last modified timestamp of a corresponding socket. The validation module can read the last modified timestamp of the object from metadata associated with the object. The object metadata can be stored separately (e.g., in a distinct object) from the object itself. The validation module can read the last modified timestamp of the socket from file system metadata associated with a virtual namespace that represents a network-based file system. If the last modified timestamp of the object matches the last modified timestamp of the socket, control flows to block 1102. If the last modified timestamp of the object does not match the last modified timestamp of the socket, control flows to block 1124.

At block 1102, the validation module determines whether file mode(s) associated with the object match file mode(s) associated with the socket. The file mode(s) can be included in the respective metadata, and may be represented as bit flags, integers, etc. If the validation module determines that the file mode(s) associated with the object match the file mode(s) associated with the socket, control flows to block 1104. If the validation module determines that the file mode(s) associated with the object do not match the file mode(s) associated with the socket, control flows to block 1124.

At block 1104, the validation module determines whether a count of hard links that reference the object matches a count of hard links that reference the socket. The count of hard links can be included in the respective metadata. If the validation module determines that the count of hard links that reference the object matches the count of hard links that reference the socket, control flows to block 1106. If the validation module determines that the count of hard links that reference the object does not match the count of hard links that reference the socket, control flows to block 1124.

At block 1106, the validation module determines whether objects corresponding to the hard links that reference the socket exist in the object store. In particular, the validation module identifies the paths to any hard links that reference the socket and determines whether objects associated with the individual hard links are located in the object store. If the validation module determines that the objects corresponding to the hard links that reference the socket exist in the object store, control flows to block 1108. If the validation module determines that the objects corresponding to the hard links that reference the socket do not exist in the object store, control flows to block 1124.

At block 1108, the validation module determines whether the user identifier assigned to the object match the user identifier assigned to the socket. The user identifier can be included in the respective metadata. If the validation unit determines that the user identifier assigned to the object match the user identifier assigned to the socket, control flows to block 1110. If the validation unit determines that the user identifier assigned to the object do no match the user identifier assigned to the socket, control flows to block 1124.

At block 1110, the validation module determines whether the group identifier assigned to the object match the group identifier assigned to the socket. The group identifier can be included in the respective metadata. If the validation unit determines that the group identifier assigned to the object match the group identifier assigned to the socket, control flows to block 1112. If the validation unit determines that the group identifier assigned to the object do not match the group identifier assigned to the socket, control flows to block 1124.

At block 1112, the validation module determines whether a last accessed timestamp associated with the object matches a last accessed timestamp associated with the socket. The last accessed timestamps can be included in the respective metadata. If the validation unit determines that the last accessed timestamp associated with the object matches the last accessed timestamp associated with the socket, control flows to block 1114. If the validation unit determines that the last accessed timestamp associated with the object does not match the last accessed timestamp associated with the socket, control flows to block 1124.

At block 1114, the validation module determines whether a last attribute modification timestamp associated with the object matches a last attribute modification timestamp associated with the socket. The last attribute modification timestamps can be included in the respective metadata. If the validation unit determines that the last attribute modification timestamp associated with the object matches the last attribute modification timestamp associated with the socket, control flows to block 1116. If the validation unit determines that the last attribute modification timestamp associated with the object does not match the last attribute modification timestamp associated with the socket, control flows to block 1124.

At block 1116, the validation module determines whether an NFS object type associated with the object matches a defined NFS object type for sockets. The NFS object type can be included in the respective metadata or configured as part of the validation module. If the NFS object type associated with the object matches the defined NFS object type for sockets, control flows to block 1118. If the NFS object type associated with the object does not match the defined NFS object type for sockets, control flows to block 1124.

At block 1118, the validation module indicates that the object is valid. The particular technique used to indicate that the object is valid can vary. For example, the validation module may implicitly indicate that the object is valid by not halting the validation process or may explicitly return a value indicating the object is valid (e.g., "true"). After the validation module indicates that the object is valid, the process ends.

At block 1124, the validation module indicates that the object is invalid. The particular technique used to indicate that the object is invalid can vary. For example, the validation module may log an error and halt the validation process or may return a value indicating that the object is invalid (e.g., "false"). After the validation module indicates that the object is invalid, the process ends.

FIGS. 7 through 11 depict example operations that can be performed to validate an object. The operations performed to validate an object can vary depending on the format of the object, the particular file system used, the type of validation, etc. For example, the validation operations for dynamic validation may vary from the operations for static validation. For example, if a validation module is performing a dynamic validation and determines that the last modified timestamps do not match (e.g., at blocks 701, 801, etc.), the validation module may not immediately indicate that the object is invalid. Instead, the validation module may recheck the object at a later point. Such a variation allows the validation module to compensate for a delay in flushing the data from the NAS gateway cache to the object store. As another example, a validation module may perform additional operations to determine whether the object is coalesced. For example, the validation module may also determine whether a version number associated with the object matches a version number associated with the file system entity.

Multiple NAS gateways can be configured as a distributed system. In the distributed system, the NAS gateways connect to a single object store. Each of NAS gateways is configured as a "reader", while a single NAS gateway is also configured as a "writer". A NAS gateway configured as a reader ("reader node") receives read operations from clients and reads corresponding data from the object store. A NAS gateway configured as a writer ("writer node") receives write operations from clients and writes the changed data to the object store. When a reader node receives a write operation from a client, the reader node forwards the write operation to the writer node.

To validate the operation of the distributed system, a validation module validates a writer node using techniques similar to those described above. The validation module also validates the reader nodes. In particular, the validation module determines whether the network-based file system presented to the client by a particular reader node includes the most recent version of a file system entity. If the network-based file system does not include the most recent version of the file system entity, the validation module periodically checks until the network-based file system includes the most recent version of the file system entity. Once the network-based file system includes the most recent version of the file system entity, the validation module compares the file system entity with the corresponding file system entity included in the network-based file system presented to the client by the writer node. If the file system entities match, the particular file system entity is validated. The validation can continue until a halt criterion is met.

Figure 12:
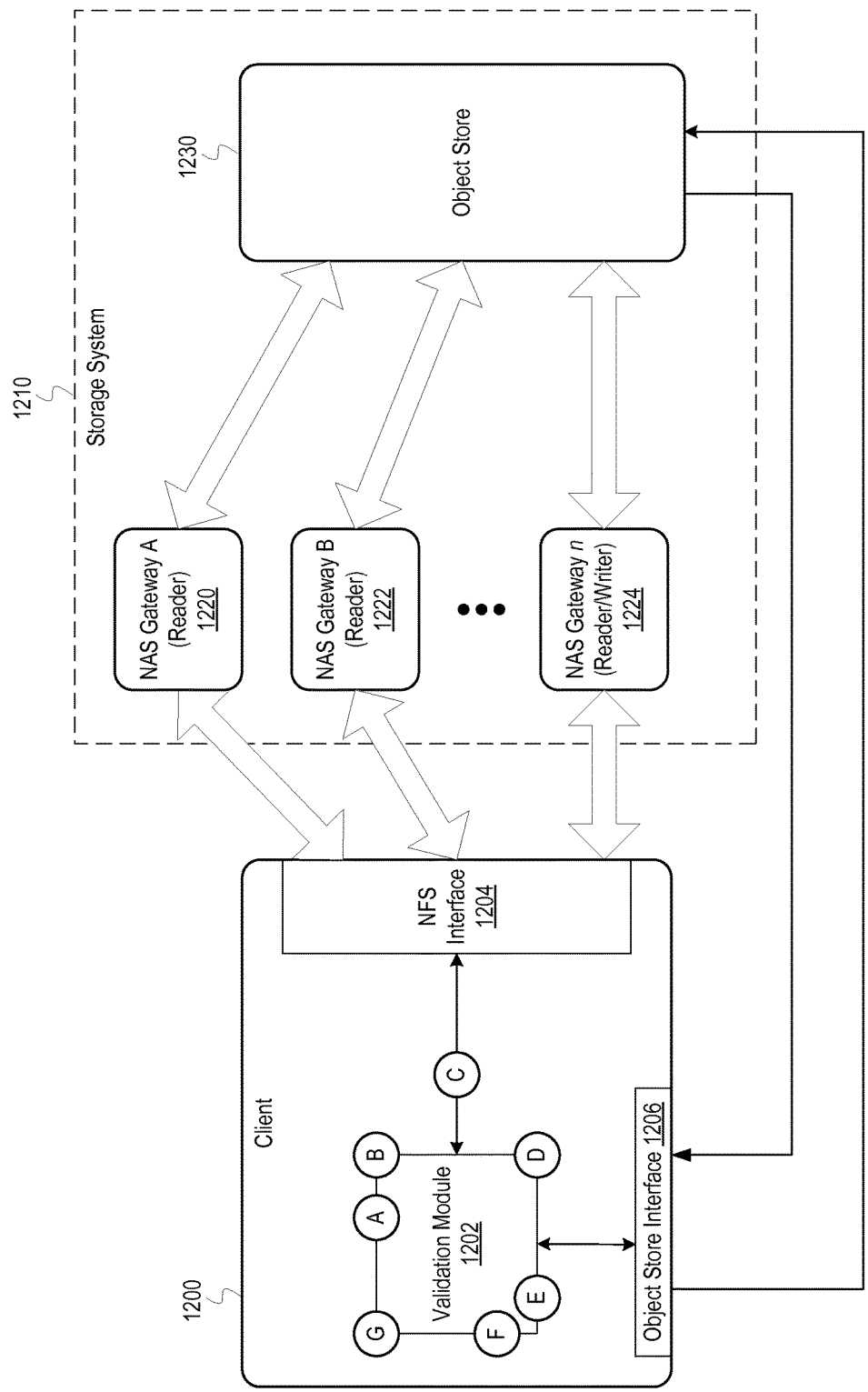
FIG. 12 depicts example operations for validating distributed NAS gateways.

FIG. 12 depicts example operations for validating distributed NAS gateways. FIG. 12 depicts a client 1200 and a storage system 1210. The client 1200 includes a validation module 1202, an NFS interface 1204, and an object store interface 1206. The storage system 1210 includes an object store 1230 and a set of NAS gateways, NAS gateway A 1220, NAS gateway B 1222, and NAS gateway n 1224 (collectively "the NAS gateways"). As indicated by the ellipses, the storage system 1210 may include additional NAS gateways. NAS gateway A 1220 and NAS gateway B 1222 are reader nodes and NAS gateway n 1224 is a reader/writer node. The client 1200 is communicatively coupled to the NAS gateways via the NFS interface 1204 and to the object store 1230 via the object store interface 1206. Communications sent to the object store 1230 via the object store interface 1206 bypass the NAS gateways.

At stage A, the validation module 1202 validates NAS gateway n 1224 as a writer node. The operations performed by the validation module 1202 can be substantially similar to those described above. For example, the validation module 1202 can perform a static validation as described in relation to FIG. 1, a dynamic validation as described in relation to FIG. 2, and/or can use a control storage system as described in relation to FIG. 3.

At stage B, the validation module 1202 selects a first of the non-writer NAS gateways. The particular technique used to select the first of the non-writer NAS gateways can vary. For example, the validation module 1202 may randomly select from a list of the NAS gateways, may select the NAS gateways in a round-robin fashion, etc. In this example, the validation module 1202 selects NAS gateway A 1220.

At stage C, the validation module 1202 begins validation of the NAS gateway A 1220 by selecting a file system entity to validate. Because NAS gateway n 1224 was validated at stage A, the validation module 1202 can assume that the network-based file system exported by NAS gateway n 1224 (hereinafter "validated file system") is accurate. Thus, the validation module 1202 selects a file system entity to validate from the file system entities that comprise the validated file system. In some configurations, the validation module 1202 selects the file system entity to validate from the network-based file system exported by NAS gateway A 1220 (hereinafter "validating file system").

The file system entity can be selected using similar techniques to those described above. For example, the validation module 1202 can select a next file system entity based on a traversal of the validated file system, randomly select a file system entity from a list of file system entities, etc.

At stage D, the validation module 1202 determines whether the file system entity can be validated. To determine whether the file system entity can be validated, the validation module 1202 determines whether the file system entity is available in the validating file system and whether the file system entity is coalesced. Determining whether the file system entity is available and coalesced allows the validation module 1202 to identify scenarios in which changes made to data in the object store 1230 have not been propagated to the particular NAS gateway.

To determine whether the file system entity is available in the validating file system, the validation module 1202 can determine whether the file system entity exists by trying to access metadata associated with the file system entity, querying the NFS interface 1204, etc. To determine whether the file system entity is coalesced, the validation module 1202 can compare last modified timestamps associated with the file system entities in the respective file systems. The validation module 1202 can also compare version identifiers between the file system entities, similar to that described above.

If the validation module 1202 determines that the file system entity can be validated, the operations of stage E are performed. If the validation module 1202 determines that the file system entity cannot be validated, the operations of stage F are performed.

At stage E, the validation module 1202 validates the file system entity. To validate the file system entity, the validation module 1202 compares the file system entity to a validated copy of the file system entity ("validated file system entity"). In this example, the file system entity as presented to the client 1200 by NAS gateway n 1224 was validated at stage A, and thus becomes the validated file system entity. In some instances, the validated file system entity can be the file system entity as represented in the object store 1230.

The validation module 1202 can compare the file system entity to the validated file system entity in a variety of ways. For example, the validation module 1202 may request data related to the file system entity and the validated file system entity from the NFS interface 1204. As another example, the validation module 1202 may compare data from a virtual namespace that includes the file system entity and data from a virtual namespace that includes the validated file system entity. The particular operations performed can be similar to those described above for validating a single NAS gateway.

At stage F, the validation module 1202 indicates that the file system entity is not coalesced and selects another reader NAS gateway (e.g., NAS gateway B 1222). The validation module 1202 can indicate that the file system entity is not coalesced by setting a flag associated with the file system entity and/or NAS gateway A 1220, adding an identifier of the file system entity and/or NAS gateway A 1220 to a list, etc.

The validation module 1202 can select another reader NAS gateway as described above at stage B. Once another reader NAS gateway has been selected, the validation module 1202 performs the operations of stages C and D again for the newly selected reader NAS gateway.

At stage G, the validation module 1202 indicates the results of the validation of the NAS gateways. As described above, the validation module 1202 can perform various operations to indicate the results of the validation. For example, in some configurations, the validation module 1202 may halt validation if a particular file system entity fails to validate or, in some configurations, may log the validation error and continue validating other file system entities.

Although the example above depicts operations in a particular order, the operations performed by the validation module 1202 can vary. For example, if the validation module 1202 determines, at stage D, that a file system entity cannot be validated, the validation module 1202 may indicate that the file system entity cannot be validated and may continue validating file system entities associated with the same NAS gateway. Alternatively, the validation module 1202 may stop validating file system entities associated with the same NAS gateway and, instead, begin validating file system entities associated with a different NAS gateway.

The validation module 1202 can periodically perform the operations at stage D for file system entities that were previously determined to not be available for validation. For example, the validation module 1202 may be configured to recheck the availability of the file system entity after a set time period has elapsed. As another example, the validation module 1202 may continue validating other file system entities and/or NAS gateways and, once all other file system entities have been validated or marked unavailable, the validation module 1202 may start rechecking the file system entities previously marked as unavailable.

Figure 13:
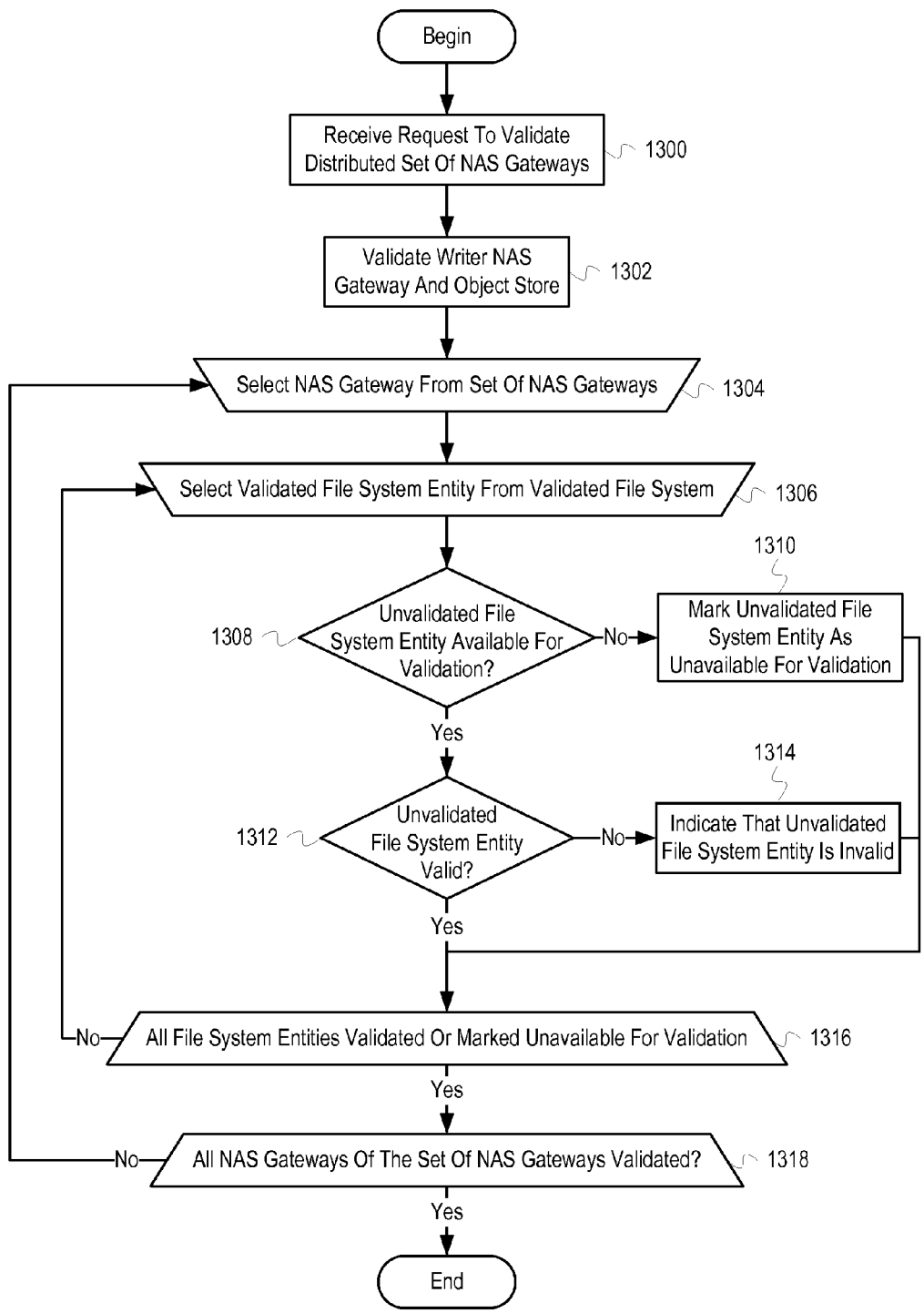
FIG. 13 depicts a flowchart of example operations for validating a distributed set of NAS gateways.

FIG. 13 depicts a flowchart of example operations for validating a distributed set of NAS gateways. The operations depicted in FIG. 13 can be performed by a validation module, such as validation module 1202 of FIG. 12, or any suitable component.

At block 1300, a validation module receives a request to validate a distributed set of NAS gateways. The request can include identification of the specific NAS gateways, whether a static or dynamic validation should be performed, etc. After the validation module receives the request to validate the distributed set of NAS gateways, control flows to block 1302.

At block 1302, the validation module validates a writer NAS gateway of the set of NAS gateways and an object store. The validation module can perform a static validation or dynamic validation of the writer NAS gateway. Whether the validation module performs a static validation or dynamic validation can depend on the configuration of the validation module, whether static of dynamic validation is specified in the request received at block 1300, etc. The operations performed by the validation module can be similar to those described above for validating a single NAS gateway. After the validation module validates the writer NAS gateway and the object store, control flows to block 1304.

At block 1304, the validation module selects a NAS gateway from the set of NAS gateways. The validation module can select the NAS gateway in a round-robin fashion, by random selection or pseudo-random selection, etc. The validation module typically excludes the writer NAS gateway that was validated at block 1302 from selection. After the validation module selects the NAS gateway, control flows to block 1306.

At block 1306, the validation module selects a validated file system entity from a validated file system. In this example, the validated file system is the file system as presented to the validation module by the writer NAS gateway. The validated file system can be represented by the file system itself, by a virtual namespace, or other representation. The validation module can select the validated file system entity by sequentially iterating over a list, traversing a hierarchical representation of the file system, randomly or pseudo-randomly, etc. After the validation module selects the validated file system entity from the validated file system, control flows to block 1308.

At block 1308, the validation module determines whether an unvalidated file system entity corresponding to the validated file system entity is available for validation. To determine whether the unvalidated file system entity is available for validation, the validation module determines whether the unvalidated file system entity exists in a file system as presented to the validation module by the selected NAS gateway ("unvalidated file system"). If the unvalidated file system entity exists in the unvalidated file system, the validation module further determines whether the unvalidated file system entity is coalesced. If the validation module determines that the unvalidated file system entity is not available for validation, control flows to block 1310. If the validation module determines that the unvalidated file system entity is available for validation, control flows to block 1312.

At block 1310, the validation module marks the unvalidated file system entity as unavailable for validation. The validation module can mark the unvalidated file system entity as unavailable for validation by adding an identifier for the unvalidated file system entity to a list, updating metadata associated with the unvalidated file system entity and or unvalidated file system, etc. After the validation module marks the unvalidated file system entity as unavailable for validation, control flows to block 1316.

Control flowed to block 1312 if, at block 1308, it was determined that the unvalidated file system entity was available for validation. At block 1312, the validation module determines whether the unvalidated file system entity is valid. To determine whether the unvalidated file system entity is valid, the validation module compares the unvalidated file system entity to the validated file system entity. The operations performed by the validation module can be similar to those described above for validating objects from an object store. For example, the validation module may compare hard link counts, checksums, etc. Additionally, the validation module may determine whether values associated with the unvalidated file system entity are assigned a particular value, such as a correct object type value. If the validation module determines that the unvalidated file system entity is not valid, control flows to block 1314. If the validation module determines that the unvalidated file system entity is valid, control flows to block 1316.

At block 1314, the validation module indicates that the unvalidated file system entity is invalid. The particular mechanism used to indicate that the unvalidated file system entity is invalid can vary. For example, the validation module may halt validation of the NAS gateways and report an error or, alternatively, continue validation of the NAS gateways and write an indication to a log. After the validation module indicates that the unvalidated file system entity is invalid, control flows to block 1316.

Control flowed to block 1316 if, at block 1312, it was determined that the unvalidated file system entity is valid. Control also flowed to block 1316 from blocks 1310 and 1314. At block 1316, the validation module determines whether all file system entities have been validated or marked unavailable for validation. If the validation module determines that all file system entities have been validated or marked unavailable for validation, control flows to block 1318. If the validation module determines that not all file system entities have been validated or marked unavailable for validation, control flows back to block 1306.

At block 1318, the validation module determines whether all NAS gateways of the set of NAS gateways have been validated. If the validation module determines that all NAS gateways of the set of NAS gateways have been validated, the process ends. If the validation module determines that not all NAS gateways of the set of NAS gateways have been validation, control flows back to block 1304.

As described above in relation to FIG. 12, the particular operations performed when the validation module determines that an unvalidated file system entity is unavailable for validation can vary. For example, instead of validating the next NAS gateway after all of the file system entities for a particular NAS gateway have been validated, the validation module may begin validating the next NAS gateway if a particular unvalidated file system entity is unavailable for validation. The operations depicted in FIG. 13 can adapted accordingly.

The operations of FIG. 13 assume that the writer NAS gateway and object store is validated at block 1302. In instances where the writer NAS gateway and object store are not validated, the process may exit.

In the examples described above, if a distributed NAS gateway being validated does not include a particular file system entity or includes an out-of-date file system entity, the validation module does not consider the unavailability of the file system entity a validation error. Instead, the validation module attempts to validate the file system entity at a later point in time. If the validation module is unable to validate the file system entity after a certain amount of time, the validation module might consider the unavailability of the file system entity a validation error. Additionally, some validation modules may be configured to send a command to a NAS gateway being validated that results in the NAS gateway retrieving the latest data from the object store. Some validation modules may be configured to consider the unavailability of a file system entity a validation error without attempting to validate the file system entity at a later point in time.

Although a distributed system can include multiple write NAS gateways, the synchronizing changes to the object store become significantly complex. However, the operations described above can be adapted for distributed systems with multiple writer NAS gateways. For example, a validation module may perform similar operations on each of the writer NAS gateways, select a single writer NAS gateway to be the writer NAS gateway for validation purposes, etc.

The examples described above draw from the NFS protocol. However, the examples can be adapted to other NAS protocols. Thus, various aspects of the examples, such as the operations performed to validate a particular object, can vary. For example, another NAS protocol may not support some of the metadata supported by the NFS protocol, and thus a validation module configured to work with the other NAS protocol may not implement operations to validate the metadata not supported by the other NAS protocol. Similarly, other NAS protocols might support additional metadata not supported by the NFS protocol.

Similarly, although the examples above describe storage systems that utilize an object store, the backing store can be any kind of storage architecture that is different than the storage architecture used by the client. In other words, the NAS gateway can be configured to translate between any two storage architectures. Further, the storage architectures may be similar, such as two different versions of the same storage architecture.

FIGS. 1 through 3 are annotated with a series of letters (e.g., A through F). These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 406 through 412 can be performed in parallel or concurrently. As another example, FIGS. 5 and 6 depict the selection of an operation to perform on a network-based file system preceding the selection of a target file system entity (blocks 506, 508, 606, and 608). However, some validation modules may select the target file system entity before selecting the operation to perform. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 14:
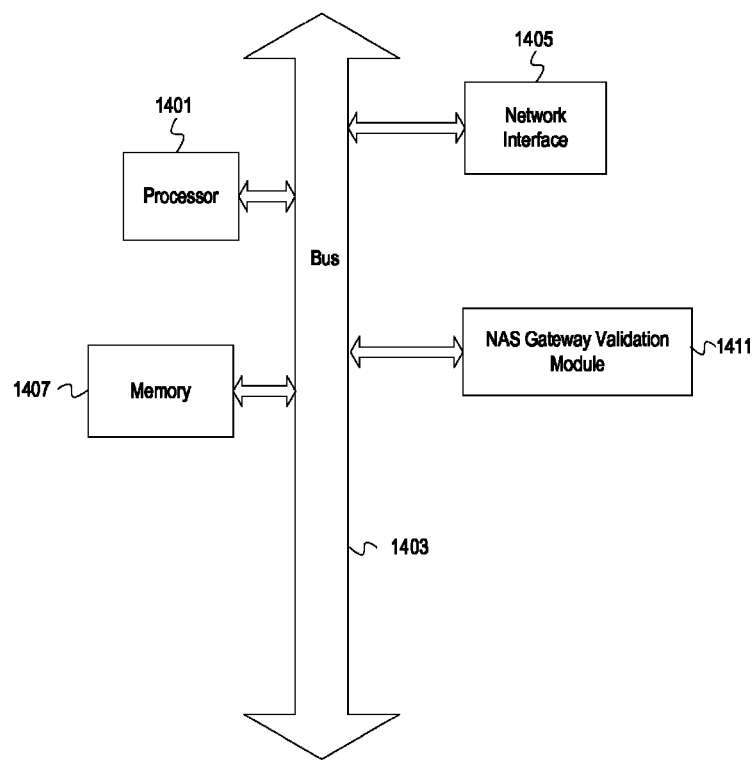
FIG. 14 depicts an example computer system with a NAS gateway validation module.

FIG. 14 depicts an example computer system with a NAS gateway validation module. The computer system includes a processor 1401 (possibly including multiple processors, multiple cores, multiple nodes, and/or implementing multi-threading, etc.). The computer system includes memory 1407. The memory 1407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1403 (e.g., PCI, ISA, PCI-Express, HyperTransport® bus, InfiniBand® bus, NuBus, etc.) and a network interface 1405 (e.g., a Fiber Channel interface, an Ethernet interface, an internet small computer system interface, SONET interface, wireless interface, etc.). The system also includes a NAS gateway validation module 1411. The NAS gateway validation module 1411 performs static and/or dynamic validation of the operation of a NAS gateway. To perform the static and/or dynamic validation of the operation of the NAS gateway, the NAS gateway validation module 1411 builds a virtual namespace based, at least in part, on a network-based file system. The NAS gateway validation module 1411 then compares data of the virtual namespace with data from a backing store. The NAS gateway validation module 1411 may also perform operations in conjunction with the NAS gateway to dynamically validate the particular operations performed. Any one of the previously described functionalities may be partially (or entirely) implemented in hardware and/or on the processor 1401. For example, the functionality may be implemented with an application specific integrated circuit, in logic implemented in the processor 1401, in a co-processor on a peripheral device or card, etc. Further, realizations may include fewer or additional components not illustrated in FIG. 14 (e.g., video cards, audio cards, additional network interfaces, peripheral devices, etc.). The processor 1401 and the network interface 1405 are coupled to the bus 1403. Although illustrated as being coupled to the bus 1403, the memory 1407 may be coupled to the processor 1401.

While the aspects of the disclosure are described with reference to various implementations and exploitations, it will be understood that these aspects are illustrative and that the scope of the claims is not limited to them. In general, techniques for NAS gateway validation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method for validating operation of a network-attached storage gateway, the method comprising:
   receiving, by a validation module, an indication to validate operation of a network-attached storage gateway, wherein the network-attached storage gateway communicatively couples a client and an object store;
   generating, by the validation module, a virtual namespace based, at least in part, on a network-based file system implemented by the network-attached storage gateway;
   selecting, by the validation module, a first file system entity from the virtual namespace;
   determining, by the validation module, a first identifier of a first object in the object store, wherein the first object corresponds to the first file system entity;
   retrieving, by the validation module, the first object from the object store based, at least in part, on the first identifier, wherein the first object is retrieved from the object store by bypassing the network-attached storage gateway; and
   determining, by the validation module, whether the first object matches the first file system entity.

2. The method of claim 1 further comprising:
   in response to receiving the indication to validate operation of the network-attached storage gateway, determining that dynamic validation of the network-attached storage gateway should be performed;
   determining a file system entity type associated with the first file system entity;
   determining a plurality of operations associated with the file system entity type;
   selecting an operation of the plurality of operations to perform on the network-based file system; and
   performing the operation on the network-based file system, wherein the first file system entity is modified by the operation;
   wherein retrieving the first object from the object store is in response to performing the operation on the network-based file system.

3. The method of claim 2, wherein selecting the operation to perform on the network-based file system comprises selecting the operation based, at least in part, on an expected operation profile of the network-based file system.

4. The method of claim 1, further comprising:
   selecting an operation to perform on the network-based file system;
   identifying a file system entity type associated with the operation;
   identifying a plurality of file system entities from the virtual namespace, wherein each of the plurality of file system entities corresponds to the file system entity type; and
   performing the operation on the network-based file system, wherein the first file system entity is modified by the operation;
   wherein selecting the first file system entity comprises, selecting the first file system entity from the plurality of file system entities.

5. The method of claim 1, wherein generating the virtual namespace comprises:
   traversing the network-based file system; and
   storing an inode number and a name corresponding to each file system entity of the network-based file system.

6. The method of claim 1, wherein determining the first identifier of the first object comprises:
   determining an inode number associated with a second file system entity, wherein the second file system entity is a parent of the first file system entity; and
   determining a name of the first file system entity.

7. The method of claim 1, wherein determining whether the first object matches the first file system entity comprises:
   determining a file system entity type corresponding to the first file system entity;
   identifying a file system entity attribute associated with the first file system entity based, at least in part, on the virtual namespace;
   determining whether a first value for the file system entity attribute matches a second value for the file system entity attribute, wherein the first object comprises the first value and the virtual namespace comprises the second value;
   in response to determining that the first value does not match the second value, indicating that at least one of the first object or the first file system entity is not valid; and
   in response to determining that the first value matches the second value, indicating that the first object and the first file system entity are valid.

8. The method of claim 1, wherein the first object comprises a namespace object, the method further comprising:
- determining a second identifier of a second object in the object store, wherein the second object comprises a data object corresponding to the first file system entity;
- retrieving the second object from the object store based, at least in part, on the second identifier, wherein the second object is retrieved from the object store by bypassing the network-attached storage gateway; and
- determining whether the second object matches the first file system entity.

9. One or more machine readable storage media having program code stored therein, the program code comprising instructions to:
- receive an indication to validate operation of a first network-attached storage gateway, wherein the first network-attached storage gateway communicatively couples a client and an object store;
- generate a virtual namespace based, at least in part, on a first network-based file system implemented by the first network-attached storage gateway;
- select a first file system entity from the virtual namespace;
- determine a first identifier of a first object in the object store, wherein the first object corresponds to the first file system entity;
- retrieve the first object from the object store based, at least in part, on the first identifier, wherein the first object is retrieved from the object store by bypassing the first network-attached storage gateway; and
- determine whether the first object matches the first file system entity.

10. The machine readable storage media of claim 9 further comprising instructions to:
- in response to receiving of the indication to validate operation of the first network-attached storage gateway, determine that dynamic validation of the first network-attached storage gateway should be performed;
- determine a file system entity type associated with the first file system entity;
- determine a plurality of operations associated with the file system entity type;
- select an operation of the plurality of operations to perform on the first network-based file system; and
- perform the operation on the first network-based file system, wherein the first file system entity is modified by the operation;
- wherein the instructions to retrieve the first object from the object store comprise instructions to retrieve the first object from the object store in response to performing the operation of the first network-based file system.

11. The machine readable storage media of claim 10 further comprising instructions to:
- select an operation to perform on the network-based file system;
- identify a file system entity type associated with the operation;
- identify a plurality of file system entities from the virtual namespace, wherein each of the plurality of file system entities corresponds to the file system entity type; and
- perform the operation on the network-based file system, wherein the first file system entity is modified by the operation;
- wherein the instructions to select the first file system entity comprise instructions to select the first file system entity from the plurality of file system entities.

12. The machine readable storage media of claim 9, wherein the instructions to generate the virtual namespace comprise instructions to:
- traverse the first network-based file system; and
- store an inode number and a name corresponding to each file system entity of the first network-based file system.

13. The machine readable storage media of claim 9, wherein the instructions to determine whether the first object matches the first file system entity comprise instructions to:
- determine a file system entity type corresponding to the first file system entity;
- identify a file system entity attribute associated with the first file system entity based, at least in part, on the virtual namespace;
- determine whether a first value for the file system entity attribute matches a second value for the file system entity attribute, wherein the first object comprises the first value and the virtual namespace comprises the second value;
- in response to a determination that the first value does not match the second value, indicate that at least one of the first object or the first file system entity is not valid; and
- in response to determination that the first value matches the second value, indicate that the first object and the first file system entity are valid.

14. The machine readable storage media of claim 9, wherein the first object comprises a namespace object, the machine readable storage media further comprising instructions to:
- determine a second identifier of a second object in the object store, wherein the second object comprises a data object corresponding to the first file system entity;
- retrieve the second object from the object store based, at least in part, on the second identifier, wherein the second object is retrieved from the object store by bypassing the first network-attached storage gateway; and
- determine whether the second object matches the first file system entity.

15. The machine readable storage media of claim 9 further comprising instructions to:
- identify a second network-attached storage gateway, wherein the first network-attached storage gateway and the second network-attached storage gateway comprise a distributed set of network-attached storage gateways;
- determine whether a second file system entity is available for validation, wherein the second file system entity is associated with a second network-based file system implemented by the second network-attached storage gateway; and
- in response to a determination that the second file system entity is available for validation, validating the second file system entity based, at least in part, on a third file system entity, wherein the third file system entity is associated with the first network-based file system.

16. An apparatus comprising:
a processor; and
a machine readable medium having program code executable by the processor to cause the apparatus to,
- receive an indication to validate operation of a network-attached storage gateway, wherein the network-attached storage gateway communicatively couples a client and an object store;
- generate a virtual namespace based, at least in part, on a network-based file system implemented by the network-attached storage gateway;

select a first file system entity from the virtual namespace;

determine a first identifier of a first object in the object store, wherein the first object corresponds to the first file system entity;

retrieve the first object from the object store based, at least in part, on the first identifier, wherein the first object is retrieved from the object store by bypassing the network-attached storage gateway; and determine whether the first object matches the first file system entity.

17. The apparatus of claim 16, wherein the machine readable medium further comprises program code executable by the processor to cause the apparatus to:

in response to receiving of the indication to validate operation of the network-attached storage gateway, determine that dynamic validation of the network-attached storage gateway should be performed;

determine a file system entity type associated with the first file system entity;

determine a plurality of operations associated with the file system entity type;

select an operation of the plurality of operations to perform on the network-based file system; and perform the operation on the network-based file system, wherein the first file system entity is modified by the operation;

wherein the program code executable by the processor to cause the apparatus to retrieve the first object from the object store comprise program code executable by the processor to cause the apparatus to retrieve the first object from the object store in response to performing the operation of the network-based file system.

18. The apparatus of claim 17, wherein the machine readable medium further comprises program code executable by the processor to cause the apparatus to:

select an operation to perform on the network-based file system;

identify a file system entity type associated with the operation;

identify a plurality of file system entities from the virtual namespace, wherein each of the plurality of file system entities corresponds to the file system entity type; and perform the operation on the network-based file system, wherein the first file system entity is modified by the operation;

wherein the program code executable by the processor to cause the apparatus to select the first file system entity comprises program code executable by the processor to cause the apparatus to select the first file system entity from the plurality of file system entities.

19. The apparatus of claim 16, wherein the program code executable by the processor to cause the apparatus to determine whether the first object matches the first file system entity comprises program code executable by the processor to cause the apparatus to:

determine a file system entity type corresponding to the first file system entity;

identify a file system entity attribute associated with the first file system entity based, at least in part, on the virtual namespace;

determine whether a first value for the file system entity attribute matches a second value for the file system entity attribute, wherein the first object comprises the first value and the virtual namespace comprises the second value;

in response to a determination that the first value does not match the second value, indicate that at least one of the first object or the first file system entity is not valid; and in response to determination that the first value matches the second value, indicate that the first object and the first file system entity are valid.

20. The apparatus of claim 16, wherein the first object comprises a namespace object wherein the machine readable medium further comprises program code executable by the processor to cause the apparatus to:

determine a second identifier of a second object in the object store, wherein the second object comprises a data object corresponding to the first file system entity;

retrieve the second object from the object store based, at least in part, on the second identifier, wherein the second object is retrieved from the object store by bypassing the network-attached storage gateway; and determine whether the second object matches the first file system entity.

* * * * *